United States Patent [19]
Ishiwaki et al.

[11] Patent Number: 5,724,562
[45] Date of Patent: Mar. 3, 1998

[54] CLOCK-SYNCHRONIZED C-ELEMENT GROUP FOR CONTROLLING DATA TRANSFER

[75] Inventors: Masahiko Ishiwaki; Harufusa Kondoh, both of Tokyo, Japan

[73] Assignee: Mitsubishi Denki Kabushiki Kaisha, Tokyo, Japan

[21] Appl. No.: 559,654

[22] Filed: Nov. 20, 1995

[30] Foreign Application Priority Data

Dec. 21, 1994 [JP] Japan .................. 6-318789

[51] Int. Cl.$^6$ .................................. G06F 1/04
[52] U.S. Cl. ............................... 395/551; 395/559
[58] Field of Search ..................... 395/551, 555, 395/558, 559; 375/354, 355

[56] References Cited

U.S. PATENT DOCUMENTS 4,785,204  11/1988  Terada et al. ................. 307/451
4,907,187   3/1990  Terada et al. ................. 364/900
5,553,276   9/1996  Dean ........................... 395/550

Primary Examiner—Dennis M. Butler
Attorney, Agent, or Firm—Oblon, Spivak, McClelland, Maier & Neustadt, P.C.

[57] ABSTRACT

Flows of data are controlled using an externally supplied clock. A clock-synchronized C-element C1 outputs a sending signal S1 of H level to a data latch DL1 and the subsequent clock-synchronized C-element C2 and outputs an acknowledge signal A1 of H level, in synchronization with a rise of a clock signal CLK1 which is inputted to the clock-synchronized C-element C1 after the clock-synchronized C-element C1 receives a sending signal S0 of H level. Following this, the clock-synchronized C-element C1 causes the acknowledge signal A1 to fall by the next rise of the clock signal CLK1. This latches the data latch DL1. A clock signal CLK2 rises before the clock signal CLK1 falls and rises once again. In synchronization with this rise, the clock-synchronized C-element C2 performs a similar operation. As a result, the precedent clock-synchronized C-element C1 causes the sending signal S1 to fall.

22 Claims, 19 Drawing Sheets

CLOCK-SYNCHRONIZED C-ELEMENT GROUP FOR CONTROLLING DATA TRANSFER

BACKGROUND OF THE INVENTION

1. Field of the Invention

The present invention is related to any apparatuses in general which control data transfer, and more particularly, to a technique for controlling data transfer using a new C-element which has not been proposed in the past.

2. Description of the Background Art

One of conventional techniques related to an apparatus for controlling a flow of data is disclosed in IEEE JOURNAL OF SOLID-STATE CIRCUITS, Vol. 23, No. 1, February 1998, pgs. 111–116, for example. The disclosed technique uses a self-synchronizing type C-element to control each data latch group as shown in FIG. 2 of the technical literature (The details are shown in FIGS. 3(a) and 4(a).).

Self-synchronizing type signaling is conventionally adopted for control of data transfer. Since this technique allows C-elements to operate independently of each other, it is difficult to control a wanted self-synchronizing type C-element using an externally supplied signal.

SUMMARY OF THE INVENTION

A first aspect of the present invention is related to a group of clock-synchronized C-elements for controlling data transfer, comprising: a plurality of data latches which are connected to each other in a cascade configuration; and a plurality of clock-synchronized C-elements which are connected to each other in a cascade configuration in correspondence with the plurality of data latches, to control transfer of data between the plurality of data latches, wherein each one of the plurality of clock-synchronized C-elements is connected to a corresponding one of clock signal input lines for inputting a corresponding one of clock signals, the clock signals supplied to adjacent C-elements of the plurality of clock-synchronized C-elements are in a relationship that after one of the clock signals presents one type of level change and then presents another type of level change, another one of the clock signals presents the one type of level change, and each one of the plurality of clock-synchronized C-elements starts controlling transfer of data in synchronization with the one type of level change of a corresponding one of the clock signals and ceases controlling transfer of data before the corresponding one of the clock signals presents the one type of level change once again.

In the first aspect of the present invention, since an operation of each clock-synchronized C-element is controlled using the externally supplied clock signal, it is possible to externally control transfer of data between the data latches.

According to a second aspect of the present invention, in the clock-synchronized C-element group of the first aspect of the present invention, the clock signal input lines which are connected to odd-numbered C-elements of the plurality of clock-synchronized C-elements are all connected in common to a first input line, and the clock signal input lines which are connected to even-numbered C-elements of the plurality of clock-synchronized C-elements are all connected in common to a second input line.

In the second aspect of the present invention, since an operation of each clock-synchronized C-element is controlled using the externally supplied clock signal, it is possible to externally control transfer of data between the data latches. In addition, data transfer is controlled using the clock signals which are supplied on the two lines.

According to a third aspect of the present invention, in the clock-synchronized C-element group of the first aspect of the present invention, the clock signals which are inputted to the plurality of clock-synchronized C-elements are different from each other.

In the third aspect of the present invention, since an operation of each clock-synchronized C-element is controlled using the externally supplied clock signal, it is possible to externally control transfer of data between the data latches.

According to a fourth aspect of the present invention, in the clock-synchronized C-element group of the first aspect of the present invention, each one of the plurality of clock-synchronized C-elements outputs a first output signal to an associated one of the data latches and other one of neighboring clock-synchronized C-elements but outputs a second output signal to one of the neighboring clock-synchronized C-elements in synchronization with one type of level change of a corresponding one of the clock signals which is received after receiving a signal from the one of the neighboring clock-synchronized C-elements, and each one of the plurality of clock-synchronized C-elements then stops outputting the first output signal and the second output signal in synchronization with a signal which is outputted from the other one of the neighboring clock-synchronized C-elements before the corresponding one of the clock signals presents the one type of level change once again.

In the fourth aspect of the present invention, since an operation of each clock-synchronized C-element is controlled using the externally supplied clock signal, it is possible to externally control transfer of data between the data latches.

A fifth aspect of the present invention is related to a group of clock-synchronized C-elements for controlling data transfer, comprising: a plurality of data latches which are connected to each other in a cascade configuration; and a plurality of clock-synchronized C-elements which are connected to each other in a cascade configuration in correspondence with the plurality of data latches, to control transfer of data between the plurality of data latches, wherein each one of the plurality of clock-synchronized C-elements is connected to a clock signal input line for inputting a common clock signal, each one of the plurality of clock-synchronized C-elements starting controlling transfer of data in synchronization with one type of level change of the clock signal and ceasing controlling transfer of data in synchronization with another type of level change of the clock signal, and among neighboring clock-synchronized C-elements, one of the neighboring clock-synchronized C-elements is synchronized with a change in the clock signal from a first level to a second level while the other one of the neighboring clock-synchronized C-elements is synchronized with a change in the clock signal from the second level to the first level.

In the fifth aspect of the present invention, since an operation of each clock-synchronized C-element is controlled using the externally supplied clock signal, it is possible to externally control transfer of data between the data latches. Further, data transfer is controlled using the common clock signal.

The present invention is particularly advantageous in that the clock-synchronized C-elements are each realized in a simple circuit structure which uses a small number of gate circuits.

In addition, the circuit structure according to the present invention makes it possible to ensure that each clock-synchronized C-element outputs the second output signal in synchronization with a rise in an externally supplied clock synchronizing signal and stops outputting the second output signal in synchronization with a fall in the externally supplied clock synchronizing signal.

It is also possible to ensure that every clock-synchronized C-element accurately performs the data transfer controlling operation within one cycle time of a corresponding clock signal which is subsequent to a level change of the corresponding clock signal, without adjusting the delay time of the pulse, in a simple circuit structure which uses a small number of gate circuits.

In the structure where a stop signal is externally supplied to the clock-synchronized C-element, it is possible to disable the clock-synchronized C-element exactly at the timing of the stop signal without occurrence of the metastable phenomenon. It is also possible to disable the clock-synchronized C-element without largely modifying the circuit structure of the clock-synchronized C-elements.

In the further modified structure where clear signals are externally supplied to the clock-synchronized C-elements, it is possible to clear data which is held in one of the data latches and to thereafter transfer data which is held in the precedent data latch to the cleared data latch depending on the level values of the clear signals. During this operation, it is possible to invalidate any wanted data of data which are transferred between the data latches.

Accordingly, it is a first object of the present invention is to realize a new type of C-element which controls data transfer without evoking metastable.

A second object of the present invention is to realize the new type of C-element with a simple circuit structure which includes only a small number of gates.

A third object of the present invention is to make external control of data transfer possible and enhance the flexibility of the external control by means of the new type of C-element.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 19:
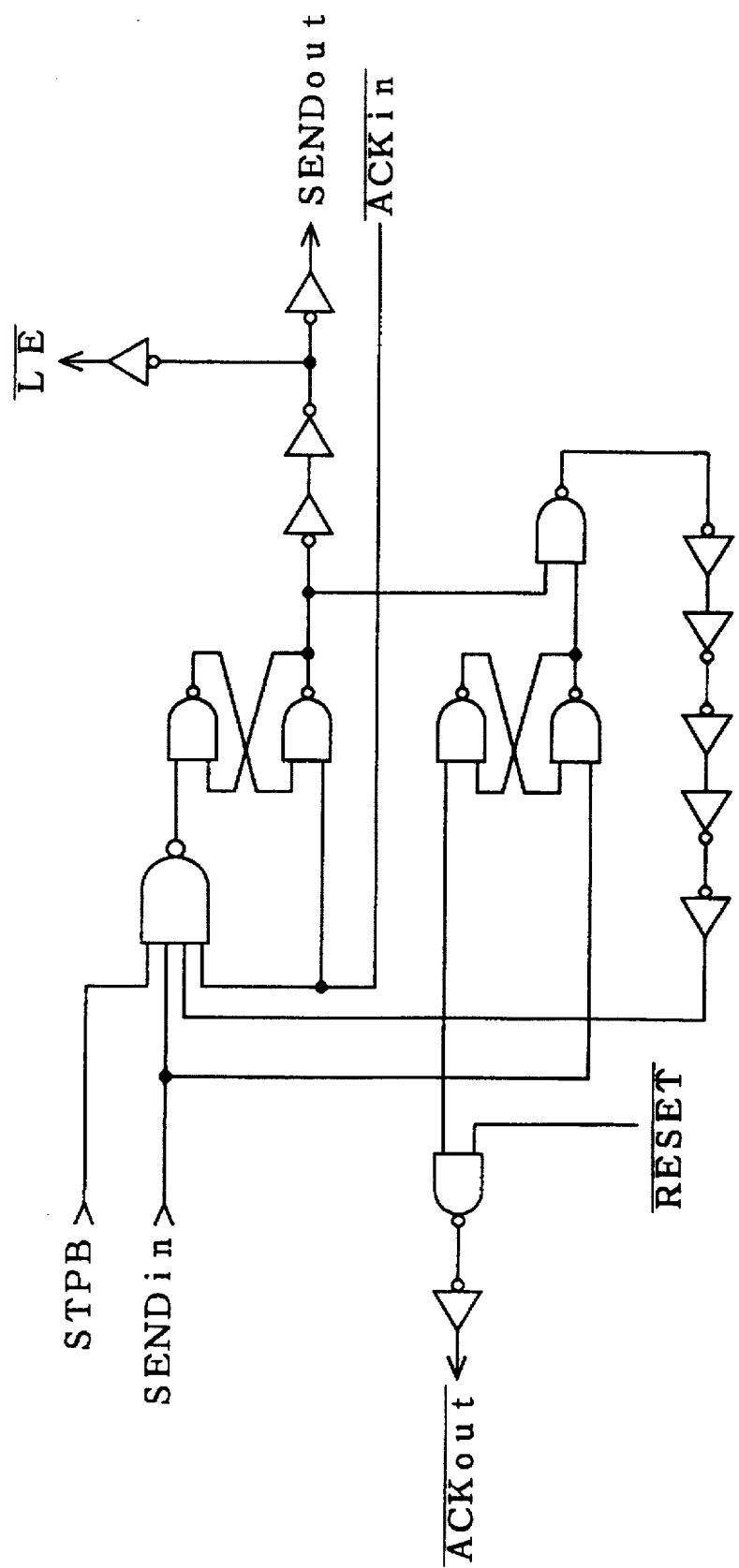
FIG. 19 is a circuitry diagram showing a proposed unknown method of solving the problem to which the present invention is related.

One of solutions to the problems associated with the conventional techniques described earlier is shown in FIG. 19. That is, a stop signal STOPB is supplied to one end of an NAND gate which is formed within a self-synchronizing type C-element and which receives an input sending signal SENDin, and an operation of a desired self-synchronizing type C-element is forcibly stopped using the stop signal STOPB. In FIG. 19, the input sending signal SENDin is a sending signal which is outputted from an immediately precedent self-synchronizing type C-element, an output sending signal SENDout is a sending signal which this self-synchronizing type C-clement sends to the next self-synchronizing type C-element, a latch clock $\overline{LE}$ is a clock which controls a data latch which corresponds to this self-synchronizing type C-element into a latching state, an input acknowledging signal $\overline{ACKin}$ is a acknowledge signal which is sent from the next self-synchronizing type C-element, and output acknowledging signal $\overline{ACKout}$ is a acknowledge signal which is to be sent to the precedent self-synchronizing type C-element. The circuit structure shown in FIG. 19 is not a known structure.

The method shown in FIG. 19 nevertheless has a limited success in making it easy to accurately control a wanted self-synchronizing type C-element using the externally supplied stop signal STOPB. This is because it is not possible to concurrently finalize values of the respective signals SENDin, SENDout, $\overline{ACKin}$ and $\overline{ACKout}$ at an optional time hence and an operation of the wanted self-synchronizing type C-element cannot be specified. More precisely, where the stop signal STOPB forces to ignore the input sending signal SENDin and a wanted self-synchronizing type C-element is disabled at optional timing under external control as shown in FIG. 19, a time when a value of the stop signal STOPB changes may coincide with a time when a value of the input sending signal SENDin changes. Hence, it is possible that an output from a gate receiving the stop signal STOPB is neither H level nor L level at this particular time. This phenomena is called metastable. When metastable occurs, data may be discarded or copied at a fall of the stop signal STOPB. For this reason, the structure shown in FIG. 19 which may cause metastable cannot be adopted.

Under the circumstance, the inventor of the present invention has devised the following solution.

To avoid metastable, it is necessary to impose a certain restraint on the transfer timing of a C-element. Considering this, preferred embodiments of the present invention described below control a C-element which controls data transfer by means of a clock which is externally supplied. This makes it easy to externally control data transfer. The term "C-element", although an abbreviation of "coincidence element", will be used throughout the description here since the term "C-element" is more widely used.

Now, the preferred embodiments of the present invention described will be described.

<First Preferred Embodiment>

Figure 1:
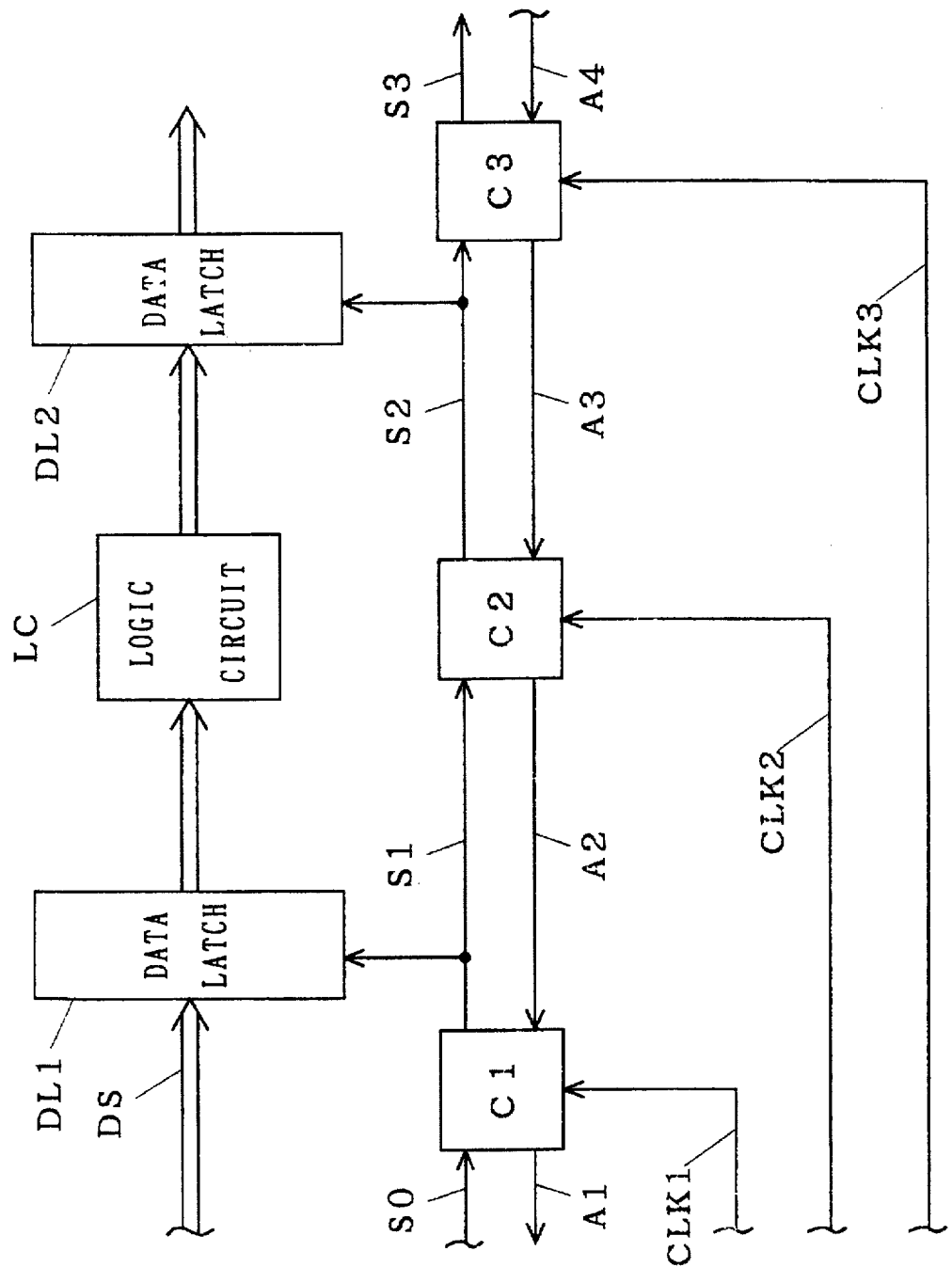
FIG. 1 is a block diagram showing a structure according to a first preferred embodiment of the present invention.

FIGS. 1 to 5 are views related to a first preferred embodiment of the present invention. First, FIG. 1 is a block diagram showing a structure of a clock-synchronized C-element group for controlling data transfer and a data latch group (DL1, LC, CL2).

In FIG. 1, denoted at C1, C2 and C3 are clock-synchronized C-elements which are connected to each other in a cascade configuration, denoted at S0, S1, S2 and S3 are sending signals (corresponding to first output signals), and denoted at A1, A2, A3 and A4 are acknowledge signals (corresponding to second output signals). Denoted at DL1 and DL2 are data latches which are connected to each other in a cascade configuration with a logic circuit LC for performing logic computation disposed between the same. Denoted at DS is a data signal. Arrows indicate the directions of flows of the signals.

The clock-synchronized C-elements C1, C2 and C3 are also connected to clock signal input lines for receiving corresponding clock signals CLK1, CLK2 and CLK3. Each clock-synchronized C-element starts controlling data transfer in synchronization to one type of change in the level of the associated clock signal. That is, the clock-synchronized C-element C1 synchronizes to the clock signal CLK1, the clock-synchronized C-element C2 synchronizes to the clock signal CLK2 and the clock-synchronized C-element C3 synchronizes to the clock signal CLK3. A relationship between the clock signals which are supplied to two adjacent C-elements is a non-overlatch relationship.

In short, after the clock signal supplied to one of the adjacent C-elements presents one type of level change (e.g., from a first level to a second level) and then presents the other type of level change (e.g., from the second level to the first level), the clock signals supplied to the remaining adjacent C-elements presents one type of level change and then presents the other type of level change before the clock signal supplied to one of the adjacent C-elements once again presents one type of level change.

In FIG. 1, a relationship between the clock signals CLK1 and CLK2 and a relationship between the clock signals CLK2 and CLK3 are both a non-overlatch relationship.

Figure 2:
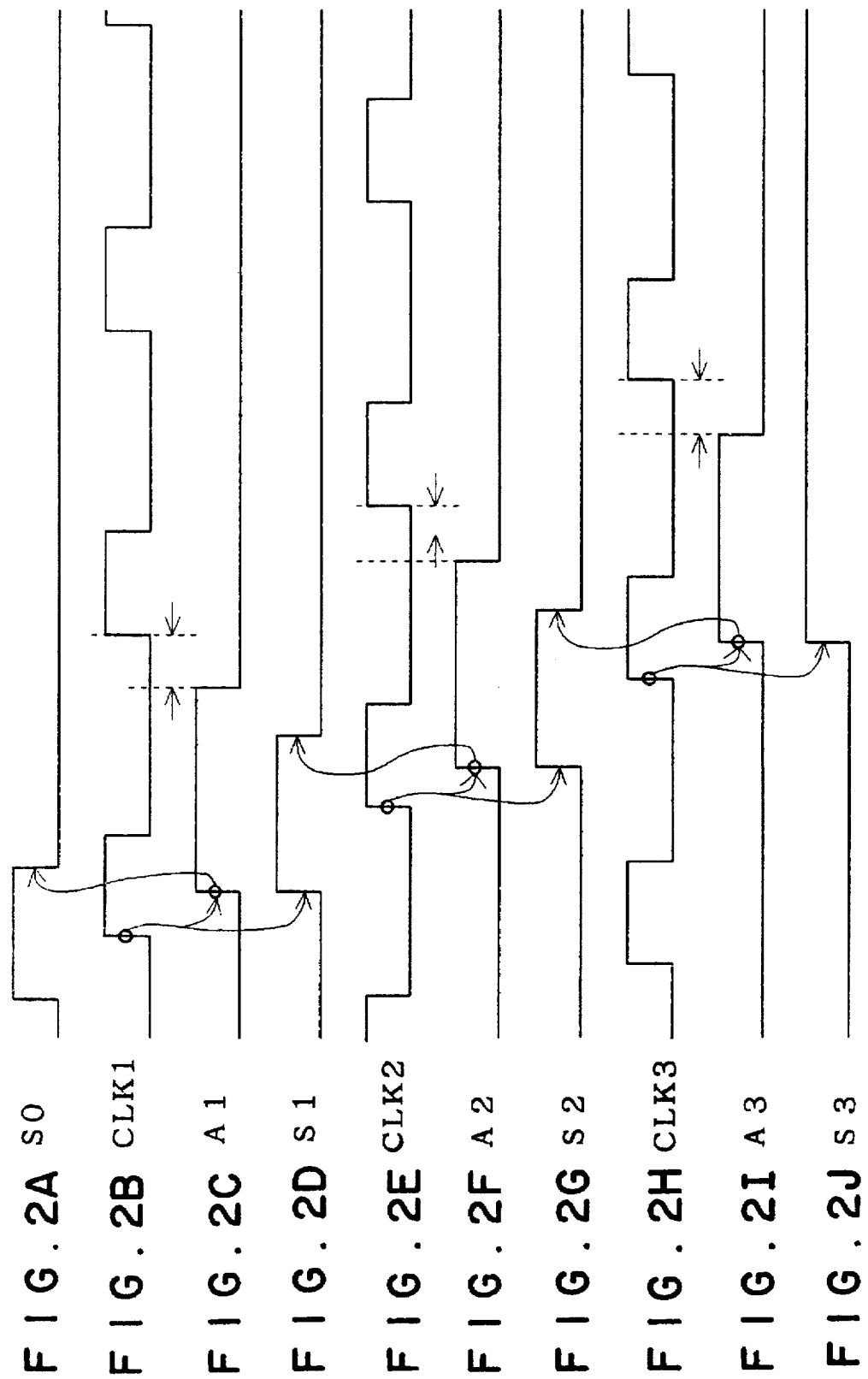
FIG. 2 is a timing chart showing signaling in the circuit of FIG. 1.

FIG. 2 is a timing chart showing signaling for the clock-synchronized C-elements in the structure according to the first preferred embodiment. Now, FIG. 2 will be described below. (1) If the sending signal S0 is at H level at a rising edge of the clock signal CLK1 from the first level (L level) to the second level (H level), the clock-synchronized C-element C1 allows both the sending signal (corresponding to the first output signals) S1 and the acknowledge signal (corresponding to the second output signals) A1 to rise from L level to H level and then outputs the signals S1 and A1. This causes the data latch DL1 to latch the data signal DS. Meanwhile, the sending signal S1 is a signal which requests data transfer from the data latch DL1 to the data latch DL2 and the acknowledge signal A1 is a signal which acknowledges latching of the data latch DL1. Following this, a precedent-stage element of the clock-synchronized C-element C1 (not shown) cause the sending signal S0 to fall in response to a rise of the acknowledge signal A1. In this embodiment, to show that the acknowledge signal A1 has risen in response to the rise of the clock signal CLK1, the clock-synchronized C-element C1 causes the acknowledge signal A1 to fall by the next rise of the clock signal CLK1, i.e., until one cycle period of the clock signal CLK1 after the rise of the clock signal CLK1.

(2) If the sending signal S1 is at H level at a rising edge of the clock signal CLK2, the next clock-synchronized C-element C2 allows both the sending signal (corresponding to the first output signal) S2 and the acknowledge signal A2 to rise and then outputs the signals S2 and A2. This causes the data latch DL2 to latch the data signal DS. Meanwhile, the precedent clock-synchronized C-element C1, in response to the rise of the acknowledge signal A2, detects that data transfer to the data latch DL2 is complete, allows the sending signal S1 to fall and then stops outputting the sending signal S1. At this time, the operation of the clock-synchronized C-element C1 is completed. Here, to show that the acknowledge signal A2 has risen in response to the rise of the clock signal CLK2, the clock-synchronized C-element C2 causes the acknowledge signal A2 to fall by the next rise of the clock signal CLK2.

(3) If the sending signal S2 is at H level at a rising edge of the clock signal CLK3, the clock-synchronized C-element C3 allows both the sending signal (corresponding to the first output signal) S3 and the acknowledge signal (corresponding to the second output signal) A3 to rise and then outputs the signals S3 and A3. This causes a data latch corresponding to the clock-synchronized C-element C3 (not shown) to latch the signal which is transferred from the data latch DL2. On the other hand, receiving the rise of the acknowledge signal A3, the precedent clock-synchronized C-element C2 causes the sending signal S2 to fall. This stops outputting of the sending signal S2 and completes the series of data transfer control by the clock-synchronized C-element C2. Again, to show that the acknowledge signal A3 has risen in response to the rise of the clock signal CLK3, the clock-synchronized C-element C3 causes the acknowledge signal A3 to fall by the next rise of the clock signal CLK3.

As described above, since the sending signals are received in synchronization to the clocks, it is possible to finalize the state of any clock-synchronized C-element.

Figure 3:
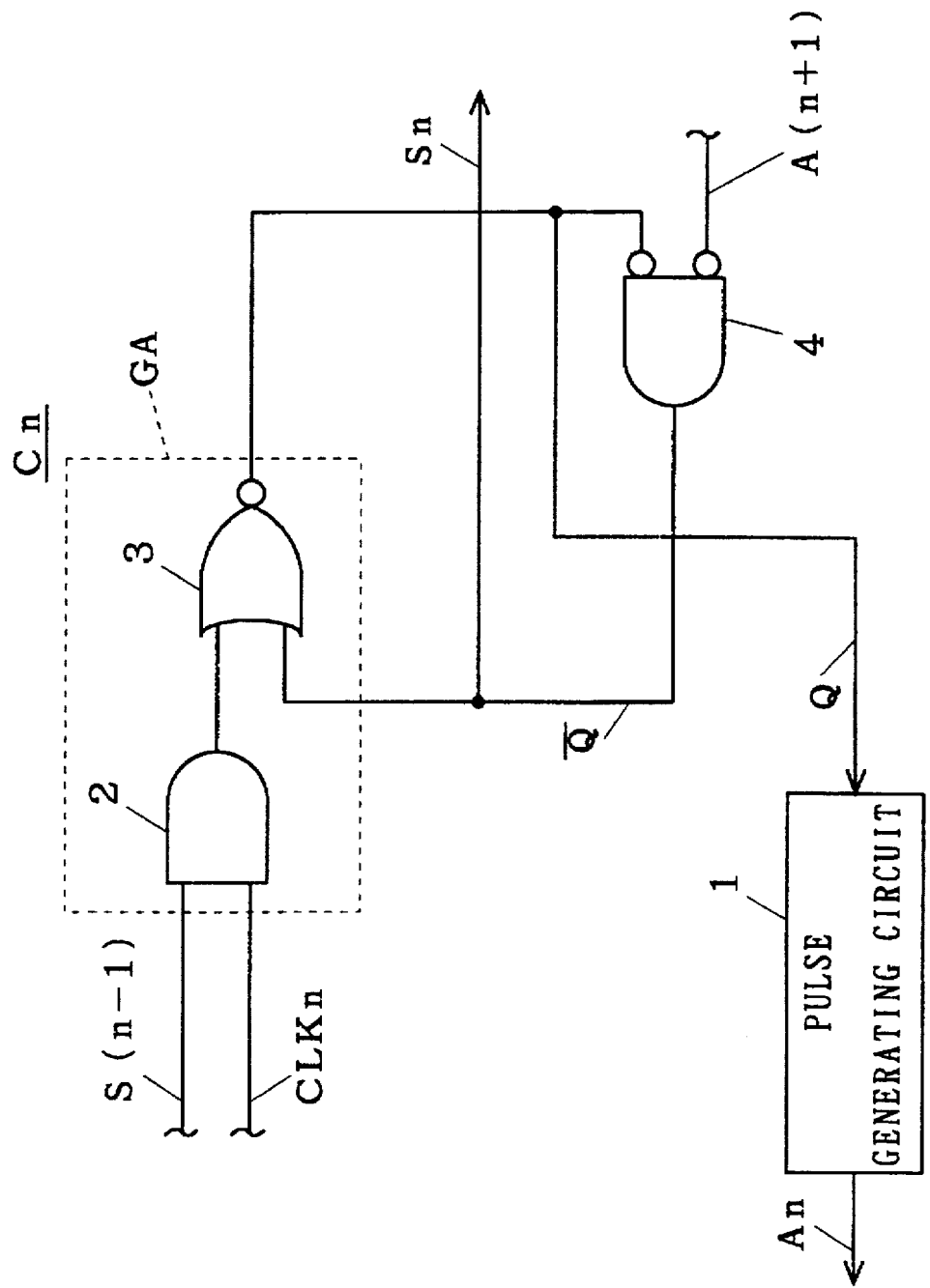
FIG. 3 is a block diagram showing a structure of the clock-synchronized C-element of FIG. 1.

FIG. 3 shows an example of a structure of the clock-synchronized C-element (C1 to C3) used in the first preferred embodiment (which is shown in FIG. 1). The clock-synchronized C-element shown in FIG. 3 is an n-th one of the clock-synchronized C-elements, i.e., a clock-synchronized C-element Cn.

In FIG. 3, a gate GA is a composite gate which is formed by a first gate 2 and a second gate 3. Of these gates, the first gate 2 receives the sending signal S(n−1) on an input line from the precedent (n−1)-th clock-synchronized C-element C(n−1) and the clock signal CLKn on a clock signal input line. Thus, the first gate 2 is a gate circuit which functions as an AND gate. Input lines for the second gate 3 are an output line from the gate 2 and an output line from a third gate 4 which will be described later. Thus, the second gate 3 is a gate circuit which functions as an NOR gate.

The third gate 4 is a gate circuit which receives the acknowledge signal A(n+1) on an input line from the (n+1)-th clock-synchronized C-element C(n+1) which is disposed at the next stage and receives an node signal Q on another input line. Thus, the third gate 4 functions as an NOR gate. The node signal Q is an output from a gate GA. An output line from the third gate 4 is an node signal $\overline{Q}$, on which the sending signal Sn is sent to the (n+1)-th clock-synchronized C-element C(n+1).

A pulse generating circuit 1 is a circuit which generates a positive (H level) pulse as the acknowledge signal An when the node signal Q falls from H level to L level.

In the structure using the clock-synchronized C-elements of FIG. 3, the inputted clock signal CLKn is kept at L level after falling. When the clock signals supplied to all clock-synchronized C-elements are kept at L level as such, the flows of the data signals are stopped.

Figure 4:
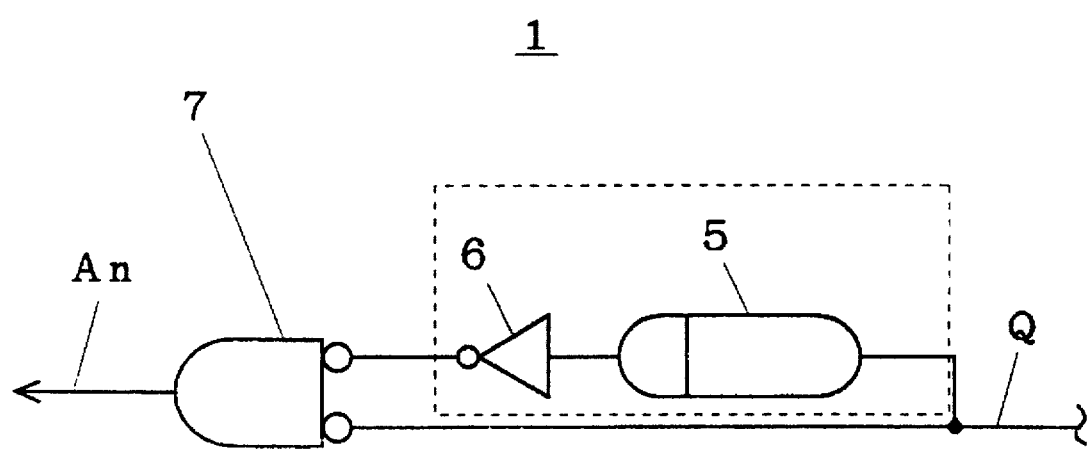
FIG. 4 is a block diagram showing a structure of a pulse generating circuit of FIG. 3.
Figure 5:
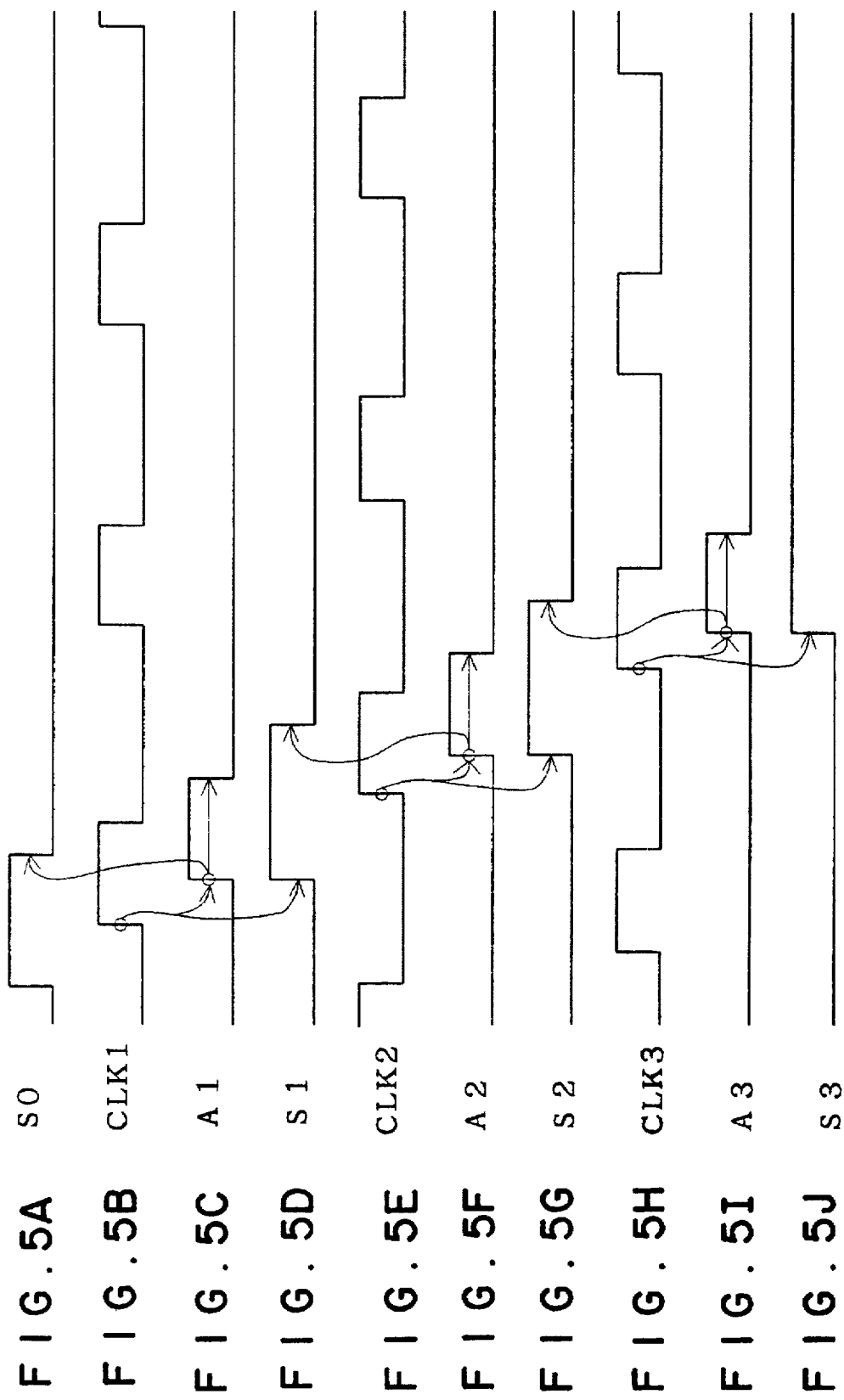
FIG. 5 is a timing chart showing signaling using the pulse generating circuit of FIG. 3.

FIG. 4 shows an example of a structure of the pulse generating circuit 1 for the clock-synchronized C-elements of FIG. 3. FIG. 5 shows an example of the timing created using the pulse generating circuit 1 of FIG. 4.

As shown in FIG. 4, generally describing, the pulse generating circuit 1 is formed by a delaying portion and a fourth gate 7. The delaying portion is formed by a delaying circuit 5, which is connected to the input line receiving the node signal Q to thereby delay the node signal Q by a predetermined time, and an invertor 6 whose input line is an output line from the delaying circuit 5. On the other hand, the fourth gate 7 is a negative logic AND gate circuit which serves an NOR gate whose input lines are an output line from the invertor 6 and the input line receiving the node signal Q.

In FIG. 4, when the node signal Q falls from H level to L level, because of the existence of the delaying portion as above, a period is created in which two inputs to the fourth gate 7 become L level at the same time during a period from the rise described above until the predetermined delay time elapses. During this period, the second output signal An is at H level. When the predetermined delay time passes, the output signal An changes to L level. In other cases, that is, when the node signal Q rises and stays at a constant level, the output signal An stays at L level. Hence, in the pulse generating circuit 1 shown in FIG. 4, utilizing the period which is determined by the predetermined delay time, the output signal An falls to L level by the clock signal CLKn rises again after the previous rise.

As described above, the period in which the acknowledge signals A1, A2 and A3 remain at H level shown in FIG. 5 has a dependency on the predetermined delay time which is set in the delaying circuit 5 shown in FIG. 4. The delaying circuit 5 shown in FIG. 4 needs be adjusted so that this period ends by each one of the clock signals CLK1, CLK2 and CLK3 rises once again.

<Second Preferred Embodiment>

Figure 6:
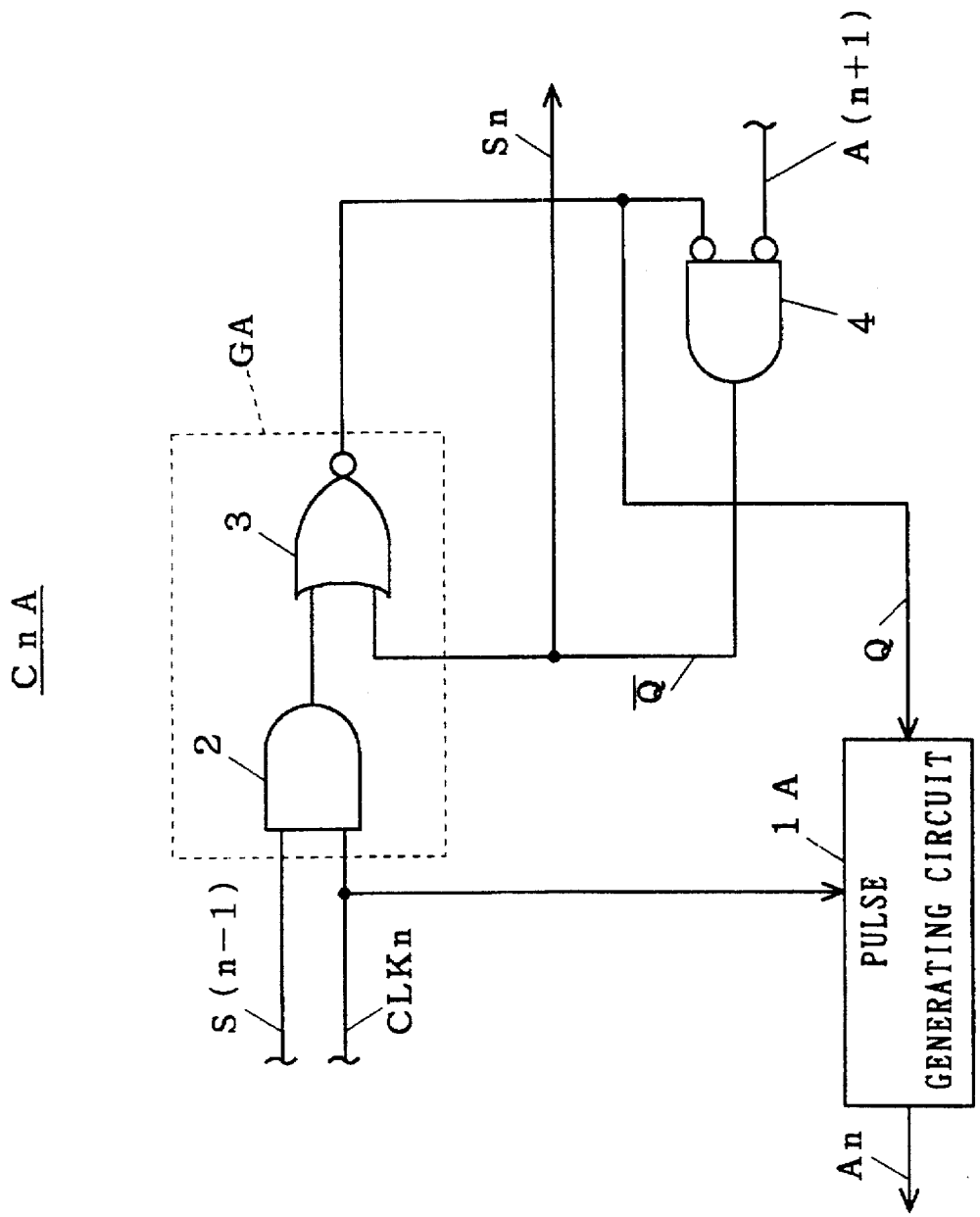
FIG. 6 i a block diagram showing a structure of a clock-synchronized C-element according to a second preferred embodiment of the present invention.
Figure 7:
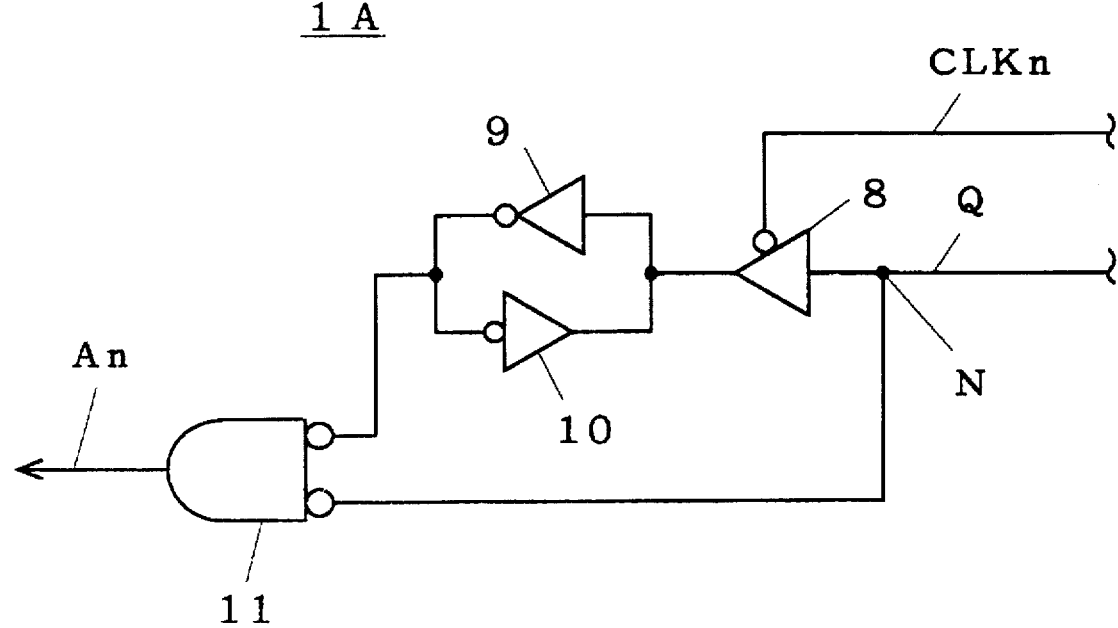
FIG. 7 is a block diagram showing a structure of the pulse generating circuit of FIG. 6.
Figure 8:
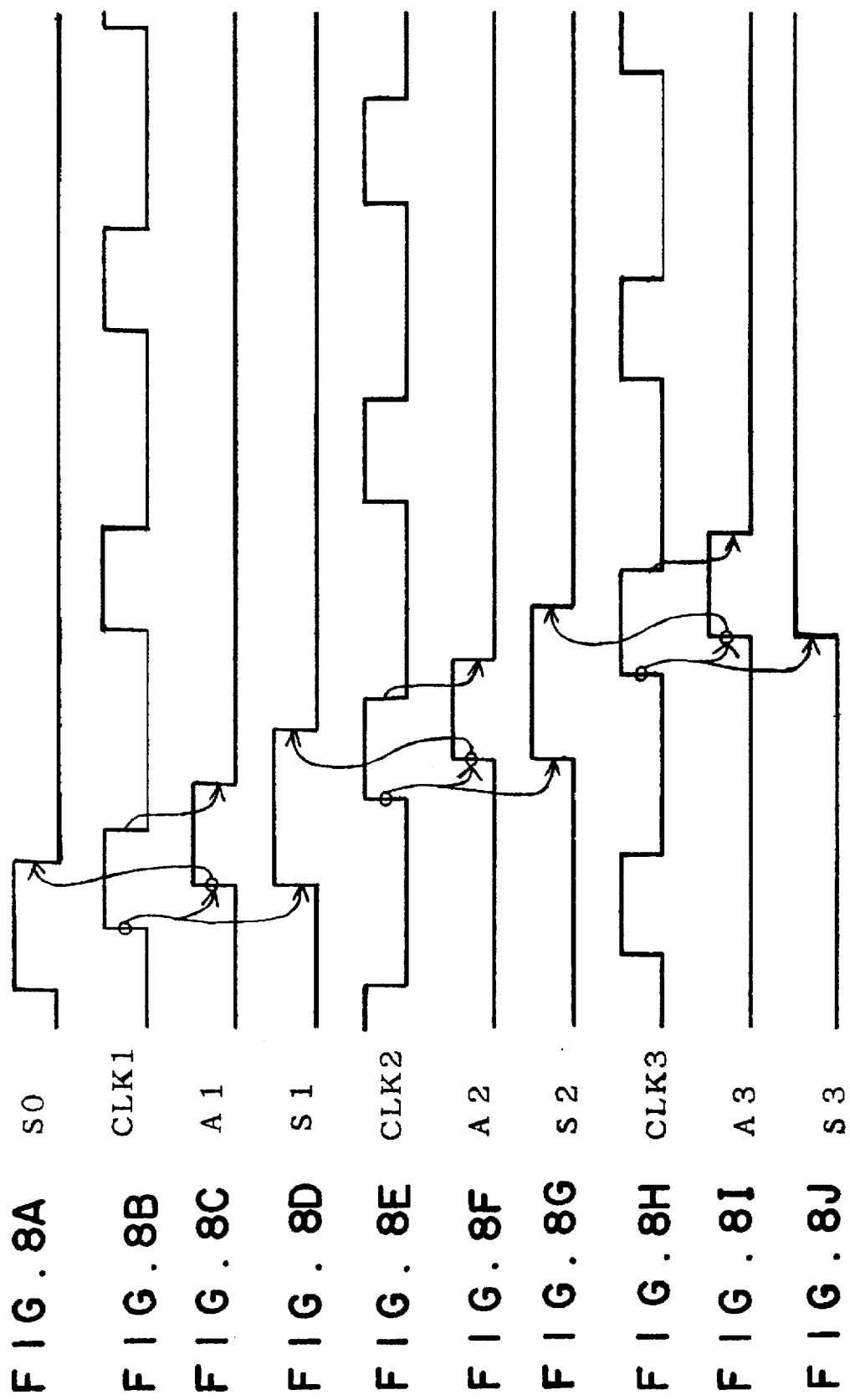
FIG. 8 is a timing chart showing signaling using the pulse generating circuit of FIG. 6.

A second preferred embodiment is related to other structure of the clock-synchronized C-elements (C1, C2, C3, ...) used in the first preferred embodiment shown in FIG. 1. FIG. 6 shows a clock-synchronized C-element CnA according to the second preferred embodiment. FIG. 6 is otherwise the same as FIG. 1. FIG. 7 shows a specific structure of a pulse generating circuit 1A of FIG. 6. Further, FIG. 8 is a timing chart representing a case where the clock-synchronized C-element CnA of FIGS. 6 and 7 is used.

The clock-synchronized C-element CnA of FIG. 6 is different from the clock-synchronized C-element Cn of FIG. 3 in terms of circuit structure that a clock input line for supplying the clock signal CLKn also serves as one of input lines to the pulse generating circuit 1A. That is, the clock-synchronized C-element CnA uses an one-shot type circuit instead of the pulse generating circuit 1 shown in FIG. 3 according to the first preferred embodiment, to the as that shown in FIG. 8 to transfer data.

In FIG. 6, elements denoted at Q, $\overline{Q}$, CLKn, S(n−1), Sn, A(n+1), GA and 4 are the same as those denoted in FIG. 3 at identical or similar reference characters.

In FIG. 7, the pulse generating circuit 1A is formed by a tri-state buffer 8, a latch circuit and a fourth gate 11. Input lines to the tri-state buffer 8 are an input line for inputting the node signal Q and a clock signal input line for inputting the clock signal CLKn. During a period in which the clock signal CLKn stays at H level after rising from L level to H level, the tri-state buffer 8 remains floating. The latch circuit is formed by two invertors 9 and 10. An output line from the tri-state buffer 8 is an input line to the latch circuit. Further, the fourth gate 11 is a negative logic AND gate which serves an NOR gate whose input lines are the line connected at an node N for inputting the node signal Q and an output line from the latch circuit.

Now, an operation in the second preferred embodiment will be described.

(1) The latch circuit of the pulse generating circuit 1A receives a value of the node signal Q as it is immediately before the clock-synchronized C-element CnA of FIG. 6 receives the sending signal S(n−1), i.e., immediately before the clock signal CLKn rises. At this point, the acknowledge signal An is at L level. In other words, since the clock signal CLKn is at L level, the node signal Q of H level is supplied to the latch circuit, and an L level output from the latch circuit and the node signal Q of H level are supplied to the fourth gate 11. As a result, the signal An stays at L level.

(2) When the clock signal CLKn rises following this, the latch circuit of the pulse generating circuit 1A holds the data as it were before the rise. The node signal Q falls immediately after the clock signal CLKn rises, and therefore, when the node signal Q falls, both of the two inputs to the fourth gate 11 are at L level. Due to this, the acknowledge signal An rises to H level and remains at H level.

Conversely, if the node signal Q does not change or the node signal Q rises, the acknowledge signal An stays at L level. It is to be noted however that since the clock signal CLKn is an non-overlap latch type signal, the node signal Q rises, that is, the acknowledge signal A(n+1) outputted from the next (n+1)-th clock-synchronized C-element rises while the clock signal CLKn remains at L level. Hence, there is no possibility that the node signal Q rises immediately after the clock signal CLKn rises.

(3) When the clock signal CLKn falls to L level following this, the tri-state buffer 8 supplies the node signal Q to the latch circuit again. As a result, the latch circuit receives a value of the node signal Q and the acknowledge signal An changes to L level. The acknowledge signal An is always at L level while the clock signal CLKn stays at L level.

Summarizing the paragraphs (1) to (3), the pulse generating circuit 1A of FIG. 7 is a circuit in which if the node signal Q is at H level before the clock signal CLKn rises but is at L level after the clock signal CLKn rises, the outputted acknowledge signal An is at H level while the clock signal CLKn is at H level. Further, since the clock signals are non-overlap latch type signals which do not overlap each other, by the circuit CnA (and 1A), a period in which the respective acknowledge signals A1, A2 and A3 of FIG. 1 are kept at H level terminates before the corresponding clock signals CLK1, CLK2 and CLK3 rise once again after one cycle time from a previous rise, respectively. This is shown in FIG. 8.

Thus, the second preferred embodiment of the present invention is advantageous in that adjustment of a delay time as that needed in the pulse generating circuit 1 of the first preferred embodiment is not necessary at all and therefore the clock-synchronized C-elements of a simpler design are obtained more easily.

<Third Preferred Embodiment>

Figure 9:
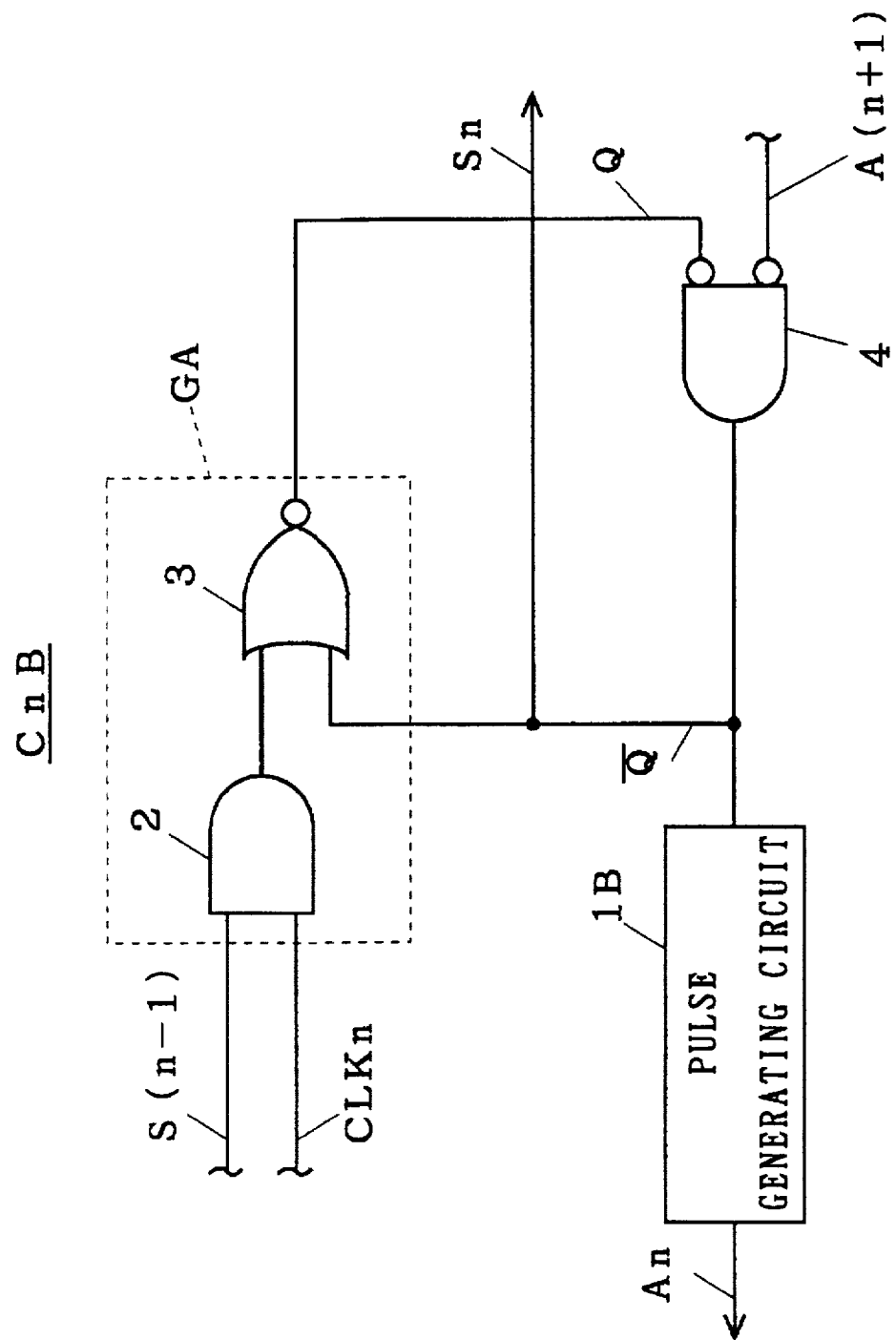
FIG. 9 is a block diagram showing a structure of a clock-synchronized C-element according to a third preferred embodiment of the present invention.

A third second preferred embodiment of the present invention is related to a modification of the clock-synchronized C-element Cn of the first preferred embodiment and the clock-synchronized C-element CnA of the second preferred embodiment, as shown in FIG. 9. More particularly, although the node signal Q is an input signal supplied to the pulse generating circuits 1 and 1A in the first and the second preferred embodiments, an node signal $\overline{Q}$ is an input signal supplied to a pulse generating circuits 1B in the third preferred embodiment. In the third preferred embodiment, the pulse generating circuits 1B is formed by connecting an invertor (not shown) which receives the node signal $\overline{Q}$ and the pulse generating circuit 1 or 1A described earlier which receives an output from the invertor in series. It is to be noted however that the clock signal input line must be connected to the pulse generating circuit 1A if the pulse generating circuit 1A is used.

The pulse generating circuit 1B receives the sending signal S(n−1) and generates a positive pulse An in response to a rise of the sending signal S(n−1).

<Fourth Preferred Embodiment>

Figure 10:
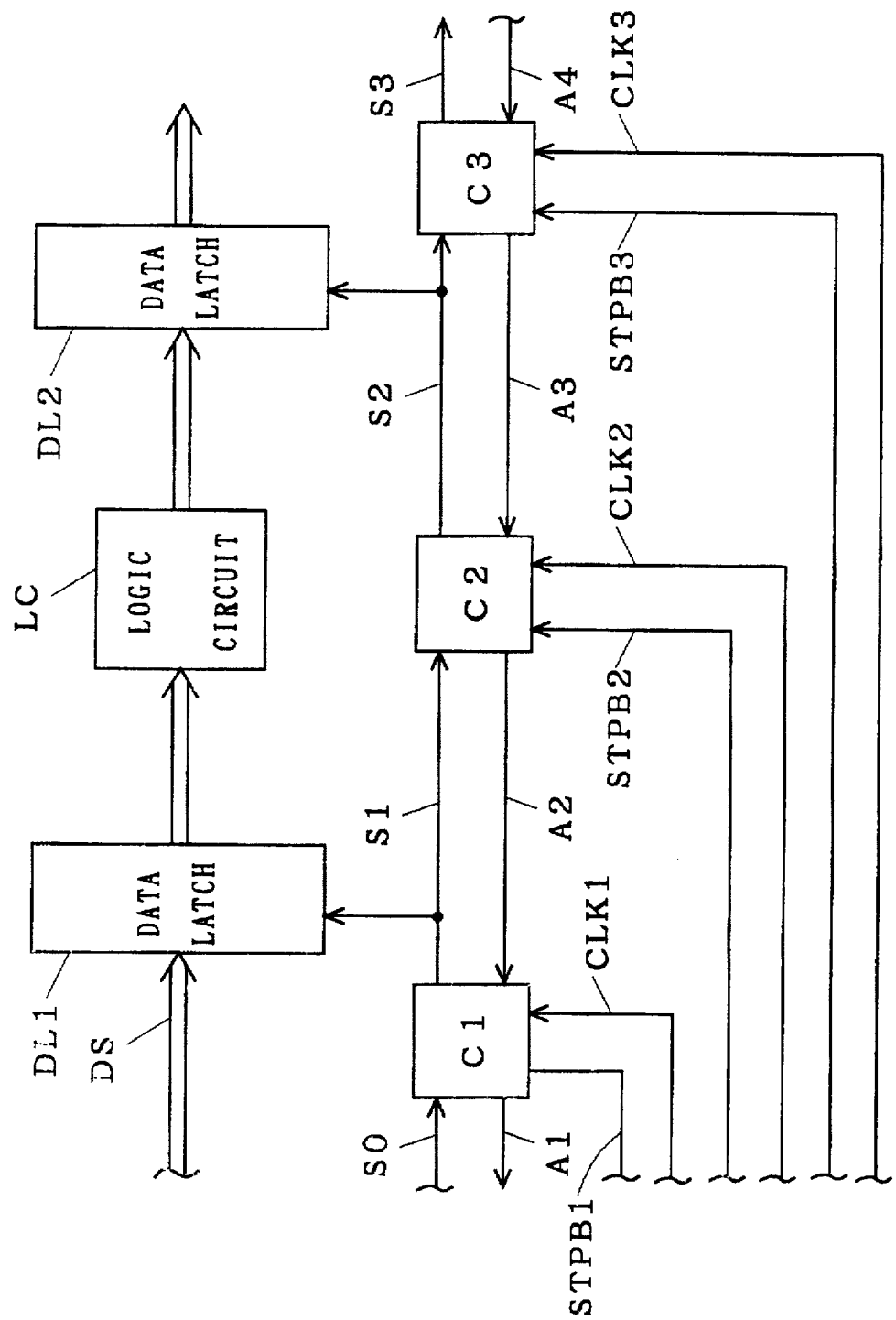
FIG. 10 is a block diagram showing a structure according to a fourth preferred embodiment of the present invention.

FIG. 10 shows an example of a structure of a clock-synchronized C-element group according to the fourth preferred embodiment of the present invention. The circuit of FIG. 10 is a modification of the first preferred embodiment. Clock-synchronized C-element CA1, CA2, CA3, ... shown in FIG. 10 are equal in structure to the clock-synchronized C-element C1, C2, C3, ... of the first preferred embodiment as they are added to stop signals STPB1, STPB2, STPB3, ...., respectively. Receiving the stop signals STPB1, STPB2 and STPB3, the clock-synchronized C-element CA1 and CA2, CA3 stop operating, whereby data transfer is stopped.

Figure 11:
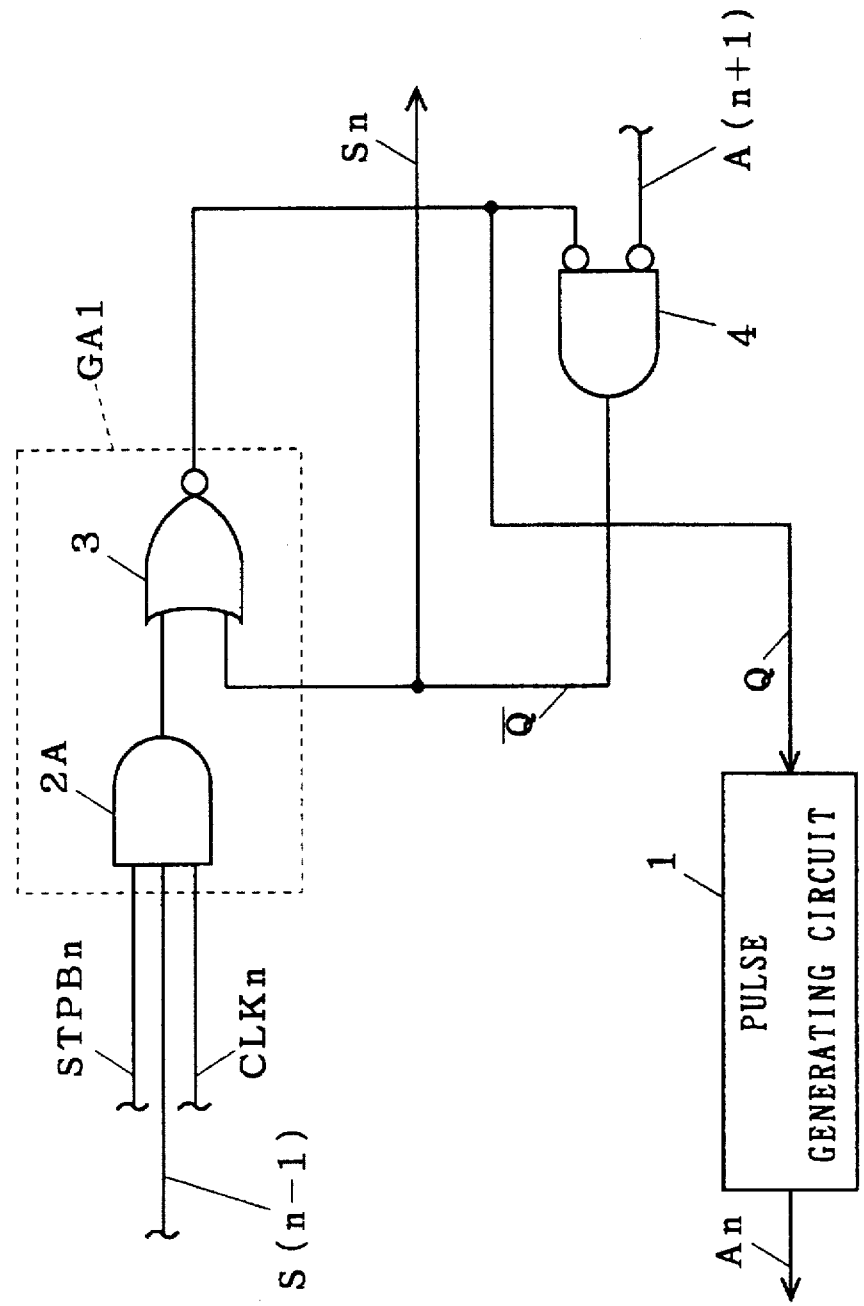
FIG. 11 is a block diagram showing a structure of the clock-synchronized C-element of FIG. 10.

FIG. 11 shows a specific structure of the clock-synchronized C-element CA1, CA2, CA3, ... (which will be referred to collectively as the clock-synchronized C-elements CAn) of FIG. 10. The clock-synchronized C-element CAn of FIG. 10 is different from the clock-synchronized C-element Cn of FIG. 3 in that a first gate 2A forming the composite GA1 is a 3-input gate. The clock-synchronized C-element CAn of FIG. 10 is otherwise the same as the clock-synchronized C-element Cn of FIG. 3. That is, input lines to the first gate 2A are an input line for receiving the first output signal S(n−1) from one of the two neighboring clock-synchronized C-elements CA(n−1), a corresponding clock input line and an input line for receiving a corresponding stop signal STPBn.

Now, FIG. 11 will be described.

(1) When the stop signal STPBn is at H level, the clock-synchronized C-elements CAn performs the same operation as that performed by the clock-synchronized C-elements Cn of FIG. 3.

Figures 12A, 12B:
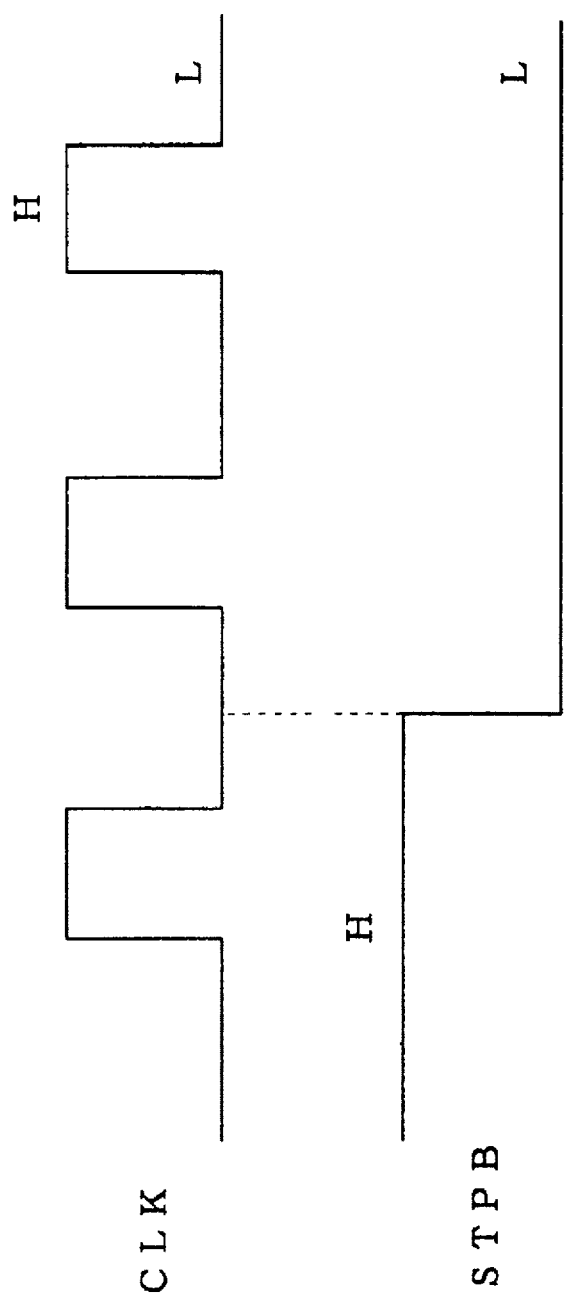
FIG. 12 is a timing chart showing a relationship between a clock signal and a stop signal.

(2) When the stop signal STPBn falls to L level, the gate GA1 ignores the clock signal CLKn and the inputted sending signal S(n−1). Further, the inputted sending signal S(n−1) is already ignored when the clock signal CLKn is at L level. Hence, the sending signal S(n−1) keeps to be ignored by changing the stop signal STPBn to L level and then maintaining the stop signal STPBn at L level while the clock signal CLKn falls to L level and remains at L level as shown in FIG. 12. As a result, the clock-synchronized C-elements CAn of FIG. 1 stops controlling data transfer without evoking metastable.

Since an operation of the clock-synchronized C-elements CAn of FIG. 11 is determined using the clock signal CLKn as described above, it is possible to disable the clock-synchronized C-elements CAn by causing the stop signal STPBn to fall while the clock signal CLKn is at L level.

Besides the method (2), there is another method for disabling as described below.

(3) The stop signal STPBn is changed to L level after the clock-synchronized C-elements CAn of FIG. 11 starts operating, following a change in the clock signal CLKn to H level, i.e., after a fall of the node signal Q.

<Fifth Preferred Embodiment>

Figure 13:
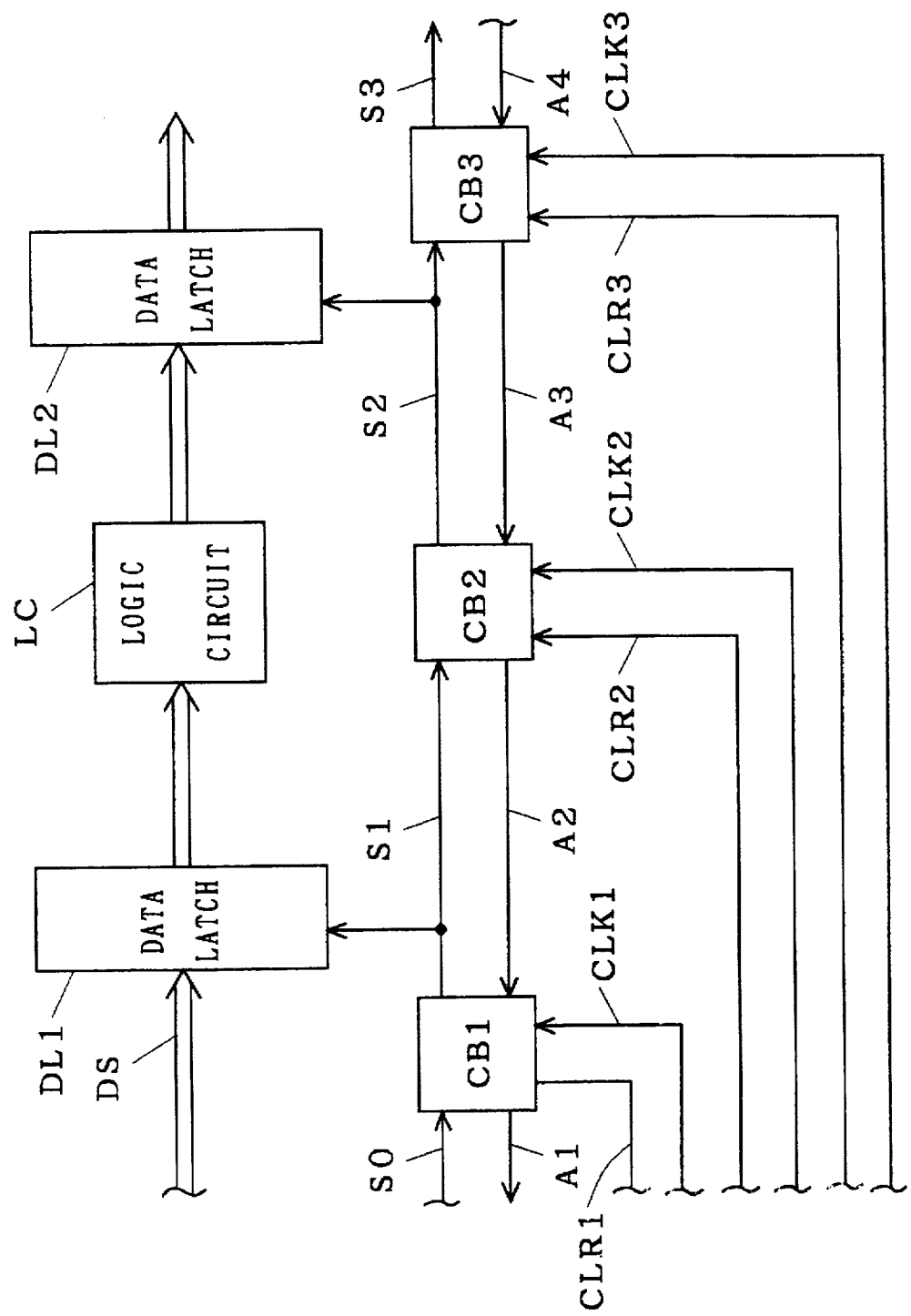
FIG. 13 is a block diagram showing a structure according to a fifth preferred embodiment of the present invention.

FIG. 13 shows a structure of a clock-synchronized C-element group according to a fifth preferred embodiment of the present invention. The circuit of FIG. 13 is also the same as that of the first preferred embodiment as it is modified to add a clear signal CLR to the clock-synchronized C-elements of FIG. 1. A clear signal CLR of L level is supplied to a desired clock-synchronized C-element of the clock-synchronized C-element group, whereby desired data held by a data latch which corresponds to this desired clock-synchronized C-element is invalidated.

Figure 14:
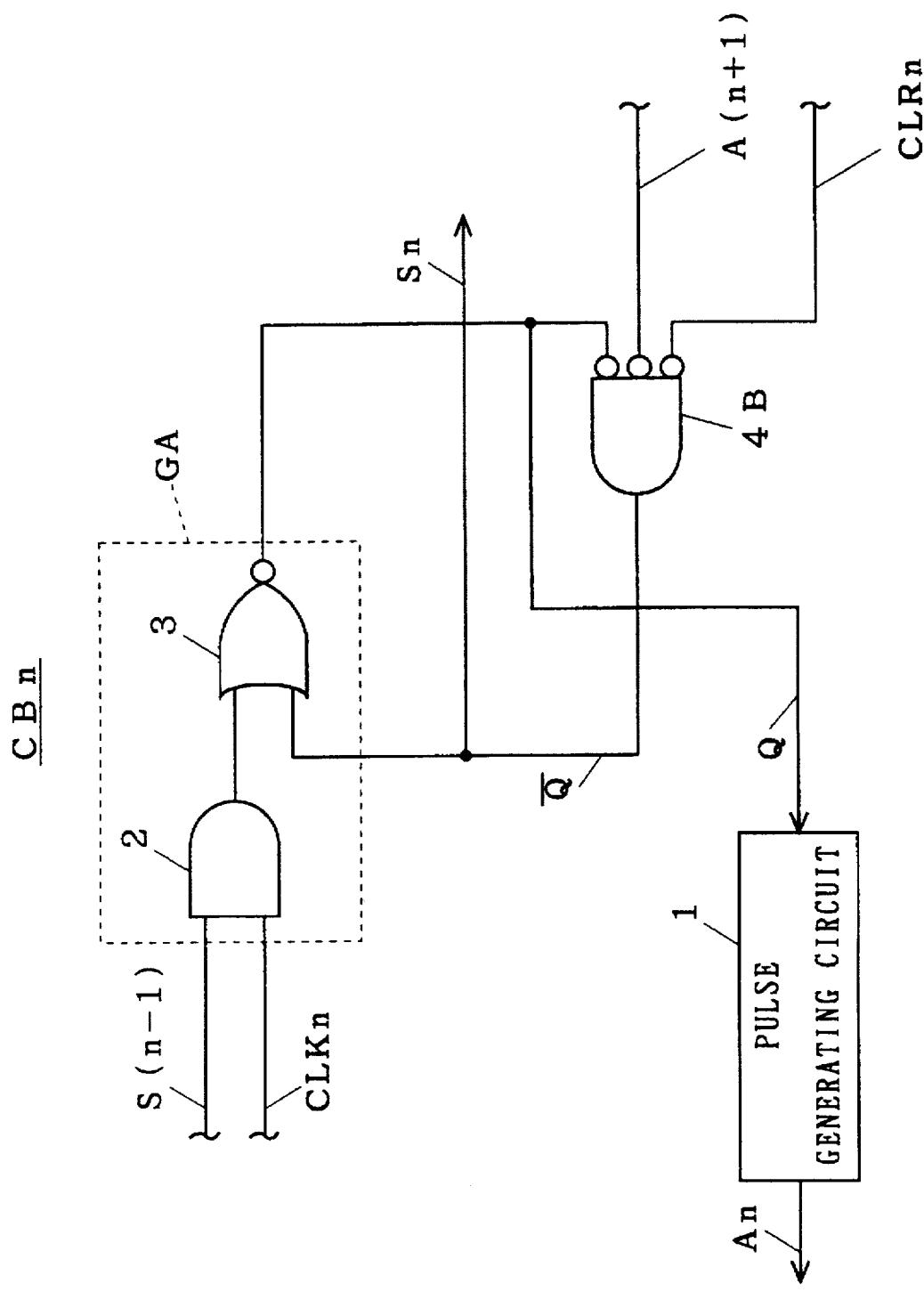
FIG. 14 is a block diagram showing a structure of the clock-synchronized C-element of 13.

FIG. 14 shows a circuit structure of the clock-synchronized C-element CB1, CB2, CB3, ... (which will be referred to collectively as the clock-synchronized C-elements CBn). The circuit structure of FIG. 14 is different from that shown in FIG. 3 in that a clear signal CLRn is supplied to a third gate 4B.

In the following, the circuit shown in FIG. 14 according to the fifth preferred embodiment will be described.

(1) When the clear signal CLRn is at L level, the clock-synchronized C-element CBn performs the same operation as the circuit shown in FIG. 3.

(2) If the clear signal CLRn is at H level, an output from the third gate 4B, i.e., the sending signal Sn changes to L level, whereby a data latch which is connected to a corresponding clock-synchronized C-element CBn is cleared. If the clear signal CLRn is maintained at L level following this, the corresponding clock-synchronized C-element invalidates data which is held by the precedent data latch.

If the fifth preferred embodiment and the fourth preferred embodiment above are combined with each other, a clock-synchronized C-element is obtained which has both the clearing function and the disabling function.

<Modifications of First to Fifth Preferred Embodiments>

(1) Signaling of each clock-synchronized C-element described above is synchronizing with a rising edge of each corresponding clock signal. Conversely, each clock-synchronized C-element may be synchronizing with a falling edge of each corresponding clock signal. In this case, H level corresponds to the first level and L level corresponds to the second level.

(2) Further, the clock-synchronized C-elements may be activated when the inputted sending signals are at L level. Alternatively, the clock-synchronized C-elements may be activated when the acknowledge signals are at L level.

<Sixth Preferred Embodiment>

Figure 15:
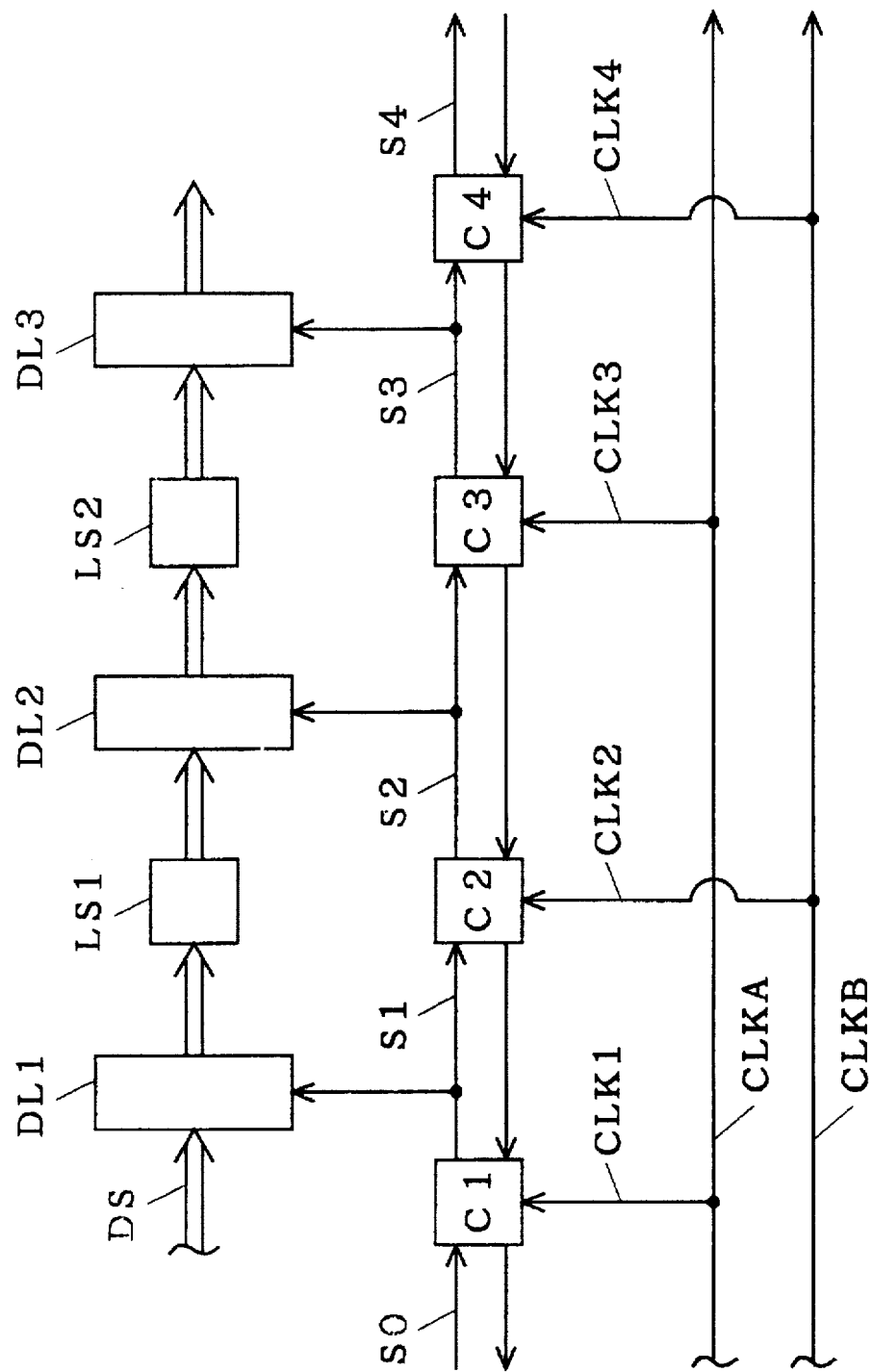
FIG. 15 is a block diagram showing a structure according to a sixth preferred embodiment of the present invention.

In the first to the fifth preferred embodiments above, completely different clock signals are supplied to the respective clock-synchronized C-elements. However, there is no problem if two types of clocks which are in a similar relationships to each other are prepared and alternately supplied to even-numbered clock-synchronized C-elements and odd-numbered clock-synchronized C-elements. Such an embodiment is a sixth preferred embodiment. FIG. 15 is a block diagram showing the sixth preferred embodiment.

In FIG. 15, clock signal input lines for supplying clock signals CLK1, CLK3, ... to odd-numbered clock-synchronized C-elements C1, C3, ... are all connected to a first input line on which a first clock signal CLKA is inputted. Hence, CLK1 =CLK3=... =CLKA. On the other hand, clock signal input lines for supplying clock signals CLK2, CLK4,... to even-numbered clock-synchronized C-elements C2, C4,... are all connected to a second input line on which a second clock signal CLKB is inputted. Hence, CLK2=CLK4=... =CLKB.

Figure 16:
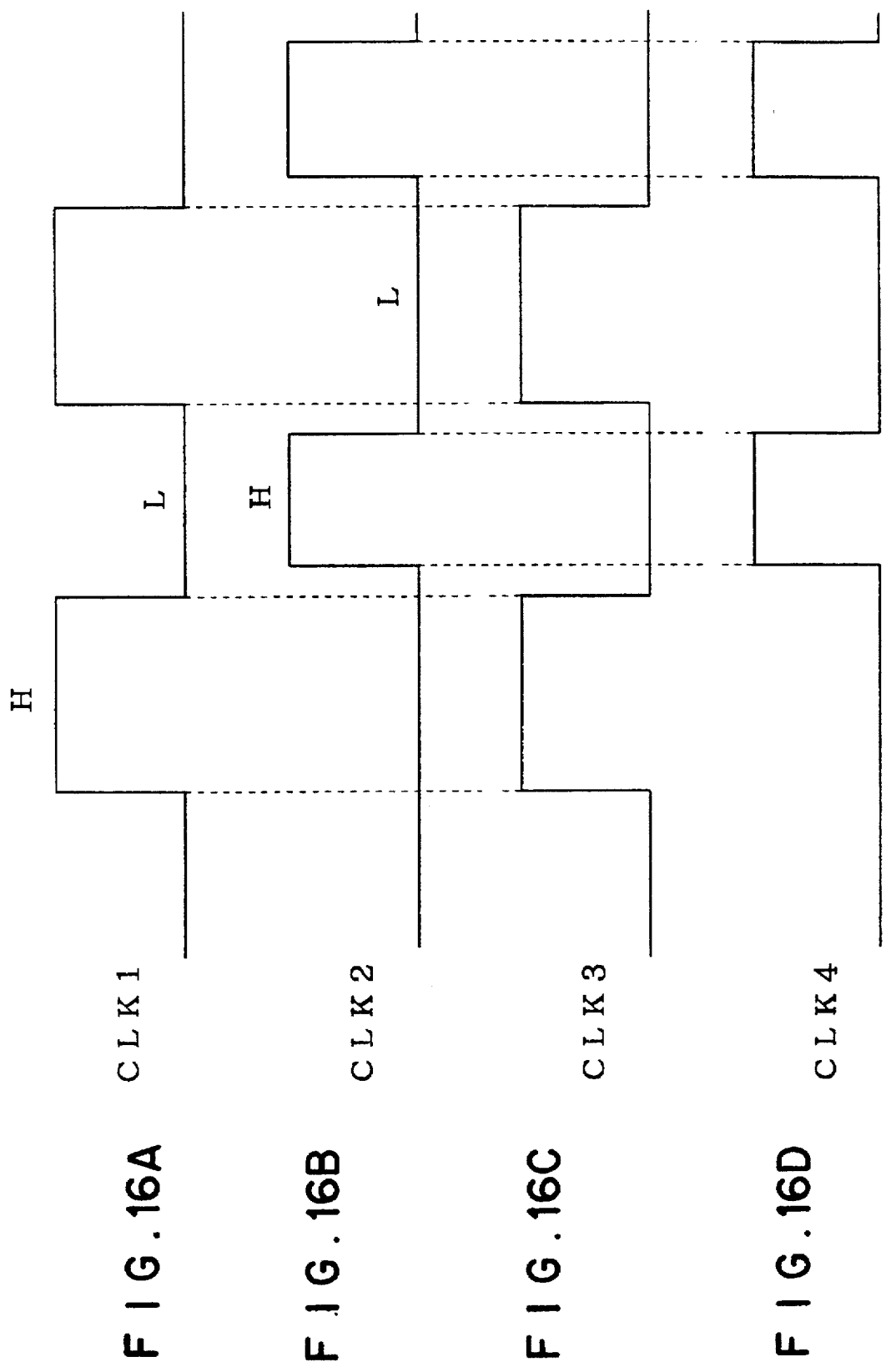
FIG. 16 is a timing chart showing a relationship between clock signals in the sixth preferred embodiment.

A relationship between the first clock signal CLKA and the second clock signal CLKB is as shown in FIG. 16. That is, when the first clock signal CLKA is at H level, the second clock signal CLKB is at L level. Conversely, when the first clock signal CLKA is at L level, the second clock signal CLKB is at H level.

The clock-synchronized C-elements C1, C2, C3, C4,... shown in FIG. 15 may have any one of the structures described earlier (shown in FIGS. 3, 6 and 9).

Although the clock-synchronized C-elements C1, C2, C3, C4,... start operating in synchronization with rising edges of corresponding clocks in the structure shown in FIG. 16, the C-elements may start operating at falling edges as mentioned above.

<Seventh Preferred Embodiment>

There is no problem either if only one clock signal is prepared. Even-numbered clock-synchronized C-elements may be synchronized with a rise of the clock signal (one type of level change: first level → second level) and odd-numbered clock-synchronized C-elements may be synchronized with a fall of the clock signal (other type of level change), or conversely the odd numbered clock-synchronized C-elements may be synchronized with the rise of the clock signal and even-numbered clock-synchronized C-elements may be synchronized with the fall of the clock signal. In this case, L level corresponds to the first level and H level corresponds to the second level.

Figure 17:
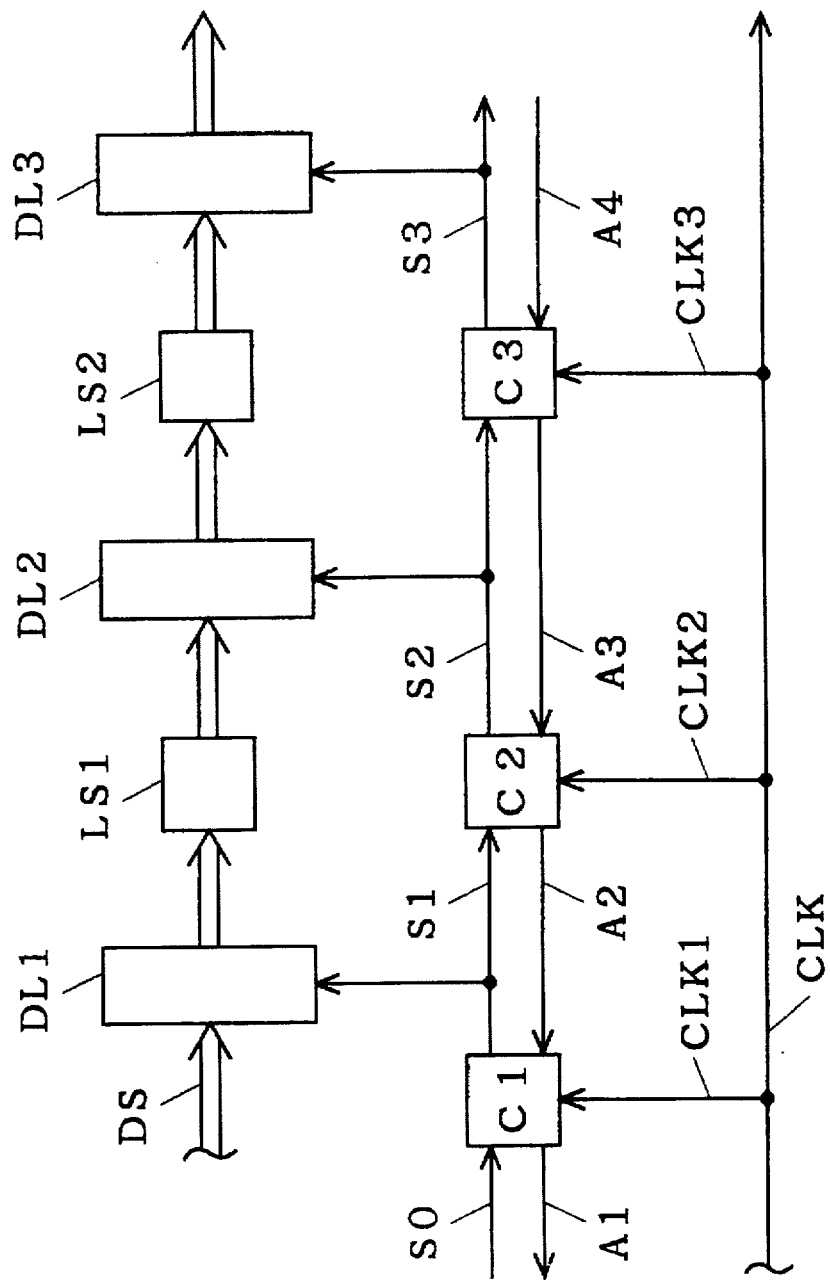
FIG. 17 is a block diagram showing a structure according to a seventh preferred embodiment of the present invention.

FIG. 17 shows an example of such a structure. In FIG. 17, clock signal input lines led from the clock-synchronized C-elements C1, C2, C3, ... are connected to a common clock signal input line on which a common clock signal CLK is inputted. Hence, CLK1=CLK2=CLK 3=... =CLK. The first, the third, ... clock-synchronized C-elements C1, C3, ... start controlling data transfer in synchronization with a rising edge of the common clock signal CLK and complete the control of data transfer before a fall of the common clock signal CLK. Conversely, the second, ... clock-synchronized C-elements C2, ... start controlling data transfer in synchronization with a falling edge of the common clock signal CLK and complete the control of data transfer before a rise of the common clock signal CLK.

The clock-synchronized C-elements may have any one of the structures described earlier. Exceptionally, the clock-synchronized C-elements which start operating in synchronization with a falling edge of the clock signal CLK must be each connected to an associated clock signal input line via an invertor.

<Eighth Preferred Embodiment>

Figure 18:
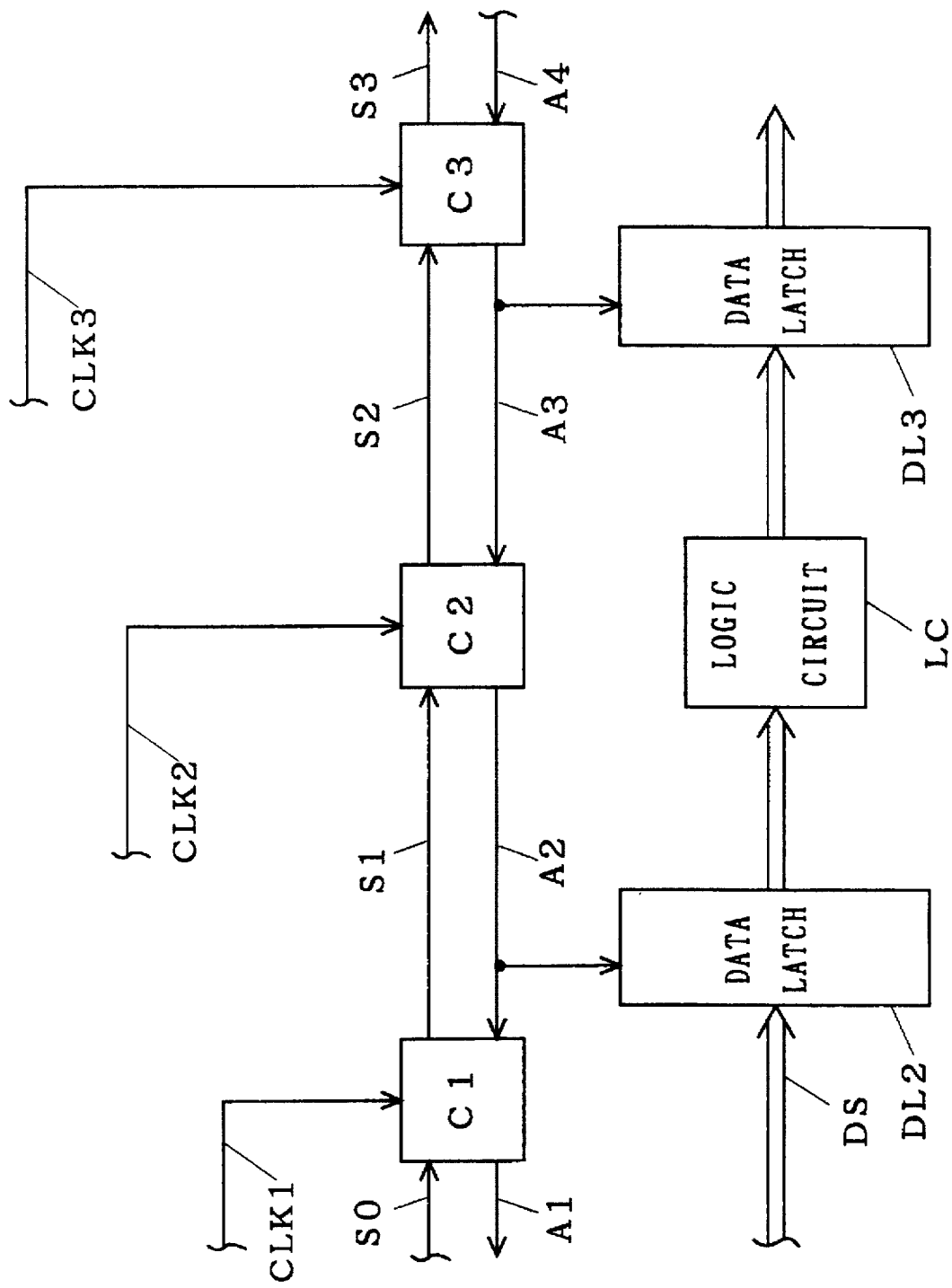
FIG. 18 is a block diagram showing a structure according to an eighth preferred embodiment of the present invention.

FIG. 18 shows a structure according to an eighth preferred embodiment of the present invention. In FIG. 18, denoted at C1, C2 and C3 are the clock-synchronized C-elements described above, denoted at S0, S1, S2 and S3 are the sending signals and denoted at A1, A2, A3 and A4 are the acknowledge signals. Arrows indicate flows of the signals. This embodiment is the same as the other embodiments in that the clock-synchronized C-elements each operate in synchronization with edges of an associated clock signal CLK. In FIG. 18 as well, the clock-synchronized C-element C1 synchronizes with the clock signal CLK1, the clock-synchronized C-element C2 synchronizes with the clock signal CLK2 and the clock-synchronized C-element C3 synchronizes with the clock signal CLK3. The clocks which are supplied to adjacent clock-synchronized C-elements are in an non-overlapping relationship. In FIG. 18, the clocks CLK1 and CLK2 are in the non-overlapping relationship and the clocks CLK2 and CLK3 are in the non-overlapping relationship.

Each clock-synchronized C-element (e.g., C2) receives an acknowledge signal (A3) of H level from the subsequent clock-synchronized C-element (one of two neighboring clock-synchronized C-elements) (e.g., C3). In synchronization with one type of change in the level of the clock signal (CLK2) which is supplied following this, this clock-synchronized C-element outputs an acknowledge signal (A2), i.e., the first output signal to the precedent clock-synchronized C-element (C1) (the other one of two neighboring clock-synchronized C-elements) and a corresponding data latch (DL2). As a result, the data latch (DL2) is latched. Meanwhile, the clock-synchronized C-element outputs the sending signal S2, i.e., the second output signal to the subsequent clock-synchronized C-element (C3). Following this, the clock-synchronized C-element (C2) stops outputting the first output signal (A2) in response to a sending signal (S1) outputted from the precedent clock-synchronized C-element (C1). Further, the clock-synchronized C-element (C2) stops outputting the second output signal (S2) before the other type of change in the level of the clock signal occurs.

While the invention has been described in detail, the foregoing description is in all aspects illustrative and not restrictive. It is understood that numerous other modifications and variations can be devised without departing from the scope of the invention.

We claim:

1. A group of clock-synchronized C-elements for controlling data transfer, comprising:

a plurality of data latches which are connected to each other in a cascade configuration; and a plurality of clock-synchronized C-elements which are connected to each other in a cascade configuration in correspondence with said plurality of data latches, to control transfer of data between said plurality of data latches, wherein each one of said plurality of clock-synchronized C-elements is connected to a corresponding one of clock signal input lines for inputting a corresponding one of clock signals, said clock signals supplied to adjacent C-elements of said plurality of clock-synchronized C-elements are in a relationship that after one of said clock signals presents one type of level change and then presents another type of level change, another one of said clock signals presents said one type of level change, and each one of said plurality of clock-synchronized C-elements starts controlling transfer of data in synchronization with said one type of level change of a corresponding one of said clock signals and ceases controlling transfer of data before the corresponding one of said clock signals presents said one type of level change once again.

2. The group of clock-synchronized C-elements for controlling data transfer of claim 1, wherein said clock signal input lines which are connected to odd-numbered C-elements of said plurality of clock-synchronized C-elements are all connected in common to a first input line, and said clock signal input lines which are connected to even-numbered C-elements of said plurality of clock-synchronized C-elements are all connected in common to a second input line.

3. The group of clock-synchronized C-elements for controlling data transfer of claim 1, wherein said clock signals which are inputted to said plurality of clock-synchronized C-elements are different from each other.

4. The group of clock-synchronized C-elements for controlling data transfer of claim 1, wherein each one of said plurality of clock-synchronized C-elements outputs a first output signal to an associated one of said data latches and other one of neighboring clock-synchronized C-elements but outputs a second output signal to one of said neighboring clock-synchronized C-elements in synchronization with one type of level change of a corresponding one of said clock signals which is received after receiving a signal from the one of said neighboring clock-synchronized C-elements, and each one of said plurality of clock-synchronized C-elements then stops outputting said first output signal and said second output signal in synchronization with a signal which is outputted from the other one of said neighboring clock-synchronized C-elements before the corresponding one of said clock signals presents said one type of level change once again.

5. The group of clock-synchronized C-elements for controlling data transfer of claim 4, wherein each one of said plurality of clock-synchronized C-elements comprises:

first gate means which is connected to a line for inputting the signal which is outputted from the one of said neighboring clock-synchronized C-elements and said clock signal input line, said first gate means functioning as an AND gate;

second gate means whose one input line is an output line of said first gate means, said second gate means functioning as an NOR gate;

third gate means which is connected to an output line of said second gate means and a line for inputting the signal which is outputted from the other one of said neighboring clock-synchronized C-elements, an output line of said third gate means being another input line of said second gate means and a line for outputting said first output signal, said third gate means functioning as an NOR gate; and pulse generating means whose input line is said output line of said second gate means, said pulse generating means outputting said second output signal in synchronization with a fall in an output from said second gate means and then stops outputting said second output signal before said clock signal rises once again.

6. The group of clock-synchronized C-elements for controlling data transfer of claim 5, wherein said pulse generating means comprises:

delaying means which is connected to an input line of said pulse generating means to delay a signal on the input line by a predetermined delay time, invert the signal and output the signal; and fourth gate means whose input line is an output line of said delaying means and whose input line is the input line of said pulse generating means, said fourth gate means functioning as an NOR gate and outputting said second output signal, and wherein said predetermined delay time is set so that said second output signal falls within one cycle time of said clock signal which is supplied to the clock-synchronized C-element.

7. The group of clock-synchronized C-elements for controlling data transfer of claim 5, wherein said first gate means is also connected to a line for inputting a stop signal, not only to the input line for receiving a signal from one of said neighboring clock-synchronized C-elements and said clock signal input line, and said stop signal falls and remains at L level after said clock signal falls.

8. The group of clock-synchronized C-elements for controlling data transfer of claim 5, wherein a line for inputting a clear signal is a further input line of said third gate means.

9. The group of clock-synchronized C-elements for controlling data transfer of claim 4, wherein each one of said plurality of clock-synchronized C-elements comprises:

first gate means which is connected to a line for inputting the signal which is outputted from the one of said neighboring clock-synchronized C-elements and said clock signal input line, said first gate means functioning as an AND gate;

second gate means whose one input line is an output line of said first gate means, said second gate means functioning as an NOR gate;

third gate means which is connected to an output line of said second gate means and a line for inputting the signal which is outputted from the other one of said neighboring clock-synchronized C-elements, an output line of said third gate means being another input line of said second gate means and a line for outputting said first output signal, said third gate means functioning as an NOR gate;

an invertor whose input line is said output line of said third gate means; and pulse generating means whose input line is an output line of said invertor, said pulse generating means outputting said second output signal in synchronization with a fall in an output from said second gate means and then stops outputting said second output signal before said clock signal rises once again.

10. The group of clock-synchronized C-elements for controlling data transfer of claim 9, wherein said pulse generating means comprises:

delaying means which is connected to an input line of said pulse generating means to delay a signal on the input line by a predetermined delay time, invert the signal and output the signal; and fourth gate means whose input line is an output line of said delaying means and whose input line is the input line of said pulse generating means, said fourth gate means functioning as an NOR gate and outputting said second output signal, and wherein said predetermined delay time is set so that said second output signal falls within one cycle time of said clock signal which is supplied to each one of said plurality of clock-synchronized C-elements.

11. The group of clock-synchronized C-elements for controlling data transfer of claim 9, wherein said first gate means is also connected a line for inputting a stop signal, not only to the input line for receiving a signal from one of said neighboring clock-synchronized C-elements and said clock signal input line, and said stop signal falls and remains at L level after said clock signal falls.

12. The group of clock-synchronized C-elements for controlling data transfer of claim 9, wherein a line for inputting a clear signal is a further input line of said third gate means.

13. The group of clock-synchronized C-elements for controlling data transfer of claim 4, wherein each one of said plurality of clock-synchronized C-elements comprises:

first gate means which is connected to a line for inputting the signal which is outputted from the one of said neighboring clock-synchronized C-elements and said clock signal input line, said first gate means functioning as an AND gate;

second gate means whose one input line is an output line of said first gate means, said second gate means functioning as an NOR gate;

third gate means which is connected to an output line of said second gate means and a line for inputting the signal which is outputted from the other one of said neighboring clock-synchronized C-elements, an output line of said third gate means being another input line of said second gate means and a line for outputting said first output signal, said third gate means functioning as an NOR gate; and pulse generating means which is connected to said output line of said second gate means and said clock signal input line, said pulse generating means outputting said second output signal in synchronization with an output from said second gate means which falls in synchronization with a rise in said clock signal and then stops outputting said second output signal in synchronization with a fall in said clock signal.

14. The group of clock-synchronized C-elements for controlling data transfer of claim 13, wherein said pulse generating means comprises:

a tri-state buffer which is connected to an input line of said pulse generating means and said clock signal input line, said tri-state buffer remaining capable of outputting a signal which is on the input line of said pulse generating means in response to a fall in said clock signal, said tri-state buffer remaining incapable of outputting the signal which is on the input line of said pulse generating means in response to a rise in said clock signal;

a latch circuit whose input line is an output line of said tri-state buffer, said latch circuit latching a reverse signal of an output from said tri-state buffer; and fourth gate means whose one input line is said input line of said pulse generating means and whose other input line is an output line of said latch circuit, said fourth gate means functioning as an NOR gate and outputting said second output signal.

15. The group of clock-synchronized C-elements for controlling data transfer of claim 13, wherein said first gate means is also connected to a line for inputting a stop signal, not only to the input line for receiving a signal from one of said neighboring clock-synchronized C-elements and said clock signal input line, and said stop signal falls and remains at L level after said clock signal falls.

16. The group of clock-synchronized C-elements for controlling data transfer of claim 13, wherein a line for inputting a clear signal is a further input line of said third gate means.

17. The group of clock-synchronized C-elements for controlling data transfer of claim 4, wherein each one of said plurality of clock-synchronized C-elements comprises:

first gate means which is connected to a line for inputting the signal which is outputted from the one of said neighboring clock-synchronized C-elements and said clock signal input line, said first gate means functioning as an AND gate;

second gate means whose one input line is an output line of said first gate means, said second gate means functioning as an NOR gate;

third gate means which is connected to an output line of said second gate means and a line for inputting the signal which is outputted from the other one of said neighboring clock-synchronized C-elements, an output line of said third gate means being another input line of said second gate means and a line for outputting said first output signal, said third gate means functioning as an NOR gate;

an invertor which is connected to said output line of said third gate means; and pulse generating means which is connected to an output line of said invertor and said clock signal input line, said pulse generating means outputting said second output signal in synchronization with an output from said second gate means which falls in synchronization with a rise in said clock signal and then stops outputting said second output signal in synchronization with a fall in said clock signal.

18. The group of clock-synchronized C-elements for controlling data transfer of claim 17, wherein said pulse generating means comprises:

a tri-state buffer which is connected to an input line of said pulse generating means and said clock signal input line, said tri-state buffer remaining capable of outputting a signal which is on the input line of said pulse generating means in response to a fall in said clock signal, said tri-state buffer remaining incapable of outputting the signal which is on the input line of said pulse generating means in response to a rise in said clock signal;

a latch circuit whose input line is an output line of said tri-state buffer, said latch circuit latching a reverse signal of an output from said tri-state buffer; and fourth gate means whose one input line is said input line of said pulse generating means and whose other input line is an output line of said latch circuit, said fourth gate means functioning as an NOR gate and outputting said second output signal.

19. The group of clock-synchronized C-elements for controlling data transfer of claim 17, wherein said first gate means is also connected to a line for inputting a stop signal, not only to the input line for receiving a signal from one of said neighboring clock-synchronized C-elements and said clock signal input line, and said stop signal falls and remains at L level after said clock signal falls.

20. The group of clock-synchronized C-elements for controlling data transfer of claim 17, wherein a line for inputting a clear signal is a further input line of said third gate means.

21. A group of clock-synchronized C-elements for controlling data transfer, comprising:

a plurality of data latches which are connected to each other in a cascade configuration; and a plurality of clock-synchronized C-elements which are connected to each other in a cascade configuration in correspondence with said plurality of data latches, to control transfer of data between said plurality of data latches, wherein each one of said plurality of clock-synchronized C-elements is connected to a clock signal input line for inputting a common clock signal, each one of said plurality of clock-synchronized C-elements starting controlling transfer of data in synchronization with one type of level change of said clock signal and ceasing controlling transfer of data in synchronization with another type of level change of said clock signal.

and among neighboring clock-synchronized C-elements, one of said neighboring clock-synchronized C-elements is synchronized with a change in said clock signal from a first level to a second level while the other one of said neighboring clock-synchronized C-elements is synchronized with a change in said clock signal from said second level to said first level.

22. The group of clock-synchronized C-elements for controlling data transfer of claim 21, wherein each one of said plurality of clock-synchronized C-elements outputs a first output signal to an associated one of said data latches and the other one of said neighboring clock-synchronized C-elements but outputs a second output signal to the one of said neighboring clock-synchronized C-elements in synchronization with said one type of level change of said clock signal which is received after receiving a signal from the one of said neighboring clock-synchronized C-elements, and each one of said plurality of clock-synchronized C-elements then stops outputting said first output signal and said second output signal in synchronization with a signal which is outputted from the other one of said neighboring clock-synchronized C-elements before said clock signal presents said one type of level change once again.

* * * * *